(12) United States Patent
Lee

(10) Patent No.: US 7,774,033 B2
(45) Date of Patent: Aug. 10, 2010

(54) SLIDING MECHANISM OF PORTABLE COMMUNICATION TERMINALS

(75) Inventor: Jun-Hong Lee, Bucheon-si (KR)

(73) Assignee: Laird Technologies Korea YH, Bucheon-si, Gyeonggi-do (KR)

(*) Notice: Subject to any disclaimer, the term of this patent is extended or adjusted under 35 U.S.C. 154(b) by 695 days.

(21) Appl. No.: 11/605,408

(22) Filed: Nov. 29, 2006

(65) Prior Publication Data

US 2007/0128904 A1 Jun. 7, 2007

(30) Foreign Application Priority Data

| Nov. 30, 2005 | (KR) | .................. 10-2005-0115379 |
| Apr. 19, 2006 | (KR) | .................. 10-2006-0035476 |
| Jun. 16, 2006 | (KR) | .................. 10-2006-0054326 |
| Jul. 6, 2006 | (KR) | .................. 10-2006-0063655 |
| Jul. 14, 2006 | (KR) | .................. 10-2006-0066468 |
| Jul. 18, 2006 | (KR) | .................. 10-2006-0067126 |
| Jul. 19, 2006 | (KR) | .................. 10-2006-0067659 |
| Oct. 25, 2006 | (KR) | .................. 10-2006-0103813 |

(51) Int. Cl.
*H04B 1/38* (2006.01)
*H04M 1/00* (2006.01)

(52) U.S. Cl. ............ 455/575.4; 455/575.1; 74/527

(58) Field of Classification Search ............ 74/527, 74/533, 534, 569; 455/90.3, 575.1, 575.4; 379/433.12; 292/60, 77, 107, 170, 163
See application file for complete search history.

(56) References Cited

U.S. PATENT DOCUMENTS

| 7,184,806 | B2* | 2/2007 | Bae ................ 455/575.4 |
| 7,257,432 | B2* | 8/2007 | Nan ................ 455/575.4 |
| 7,496,389 | B2* | 2/2009 | Cho et al. ........ 455/575.4 |
| 7,548,769 | B2* | 6/2009 | Lee et al. ........ 455/575.1 |
| 7,555,312 | B2* | 6/2009 | Kim et al. ........ 455/556.1 |
| 2004/0157653 | A1* | 8/2004 | Kato ............... 455/575.4 |
| 2004/0203496 | A1* | 10/2004 | Bae et al. ......... 455/90.1 |
| 2005/0113154 | A1* | 5/2005 | Park et al. ....... 455/575.4 |

FOREIGN PATENT DOCUMENTS

| EP | 1528755 | 5/2005 |
| EP | 1528761 | 5/2005 |
| KR | 20-2003-0000136 | 3/2003 |

* cited by examiner

*Primary Examiner*—Richard W Ridley
*Assistant Examiner*—Thomas Diaz
(74) *Attorney, Agent, or Firm*—Harness, Dickey & Pierce, P.L.C.

(57) ABSTRACT

Disclosed is a slider mechanism for slidably opening and closing a portable communication terminal. The slider mechanism includes a first plate and a second plate slidably combined with the first plate. The second plate has a cam profile formed along siding direction. A resilience unit is mounted on the first plate to exert resilient force perpendicularly to moving direction of the second plate. A roller is rotatably attached to an end of the resilience unit. The roller runs along the cam profile while the portable terminal opens or closes. Formed at a desired position of the cam profile is a depression on which the roller rests to hold the terminal in place at closed or opened state, or at any other desired position.

34 Claims, 33 Drawing Sheets

(a)
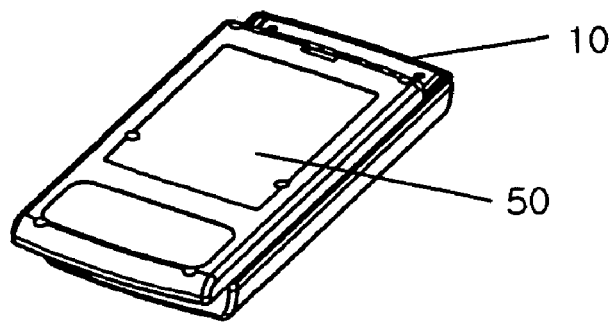
(b)
*Fig. 10*
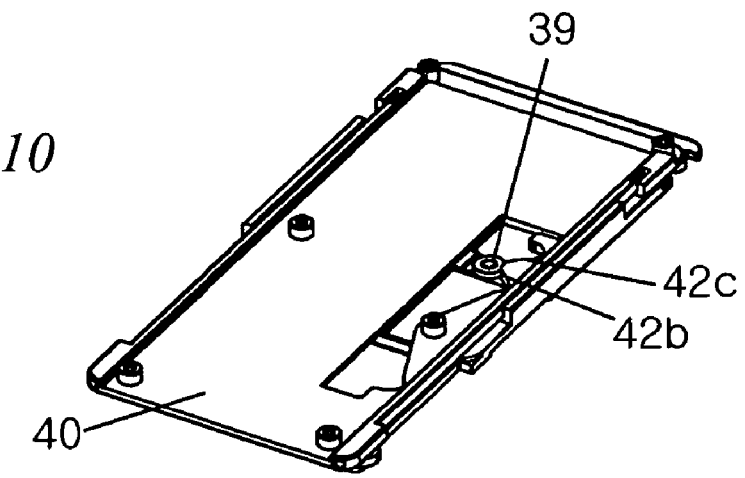
(c)
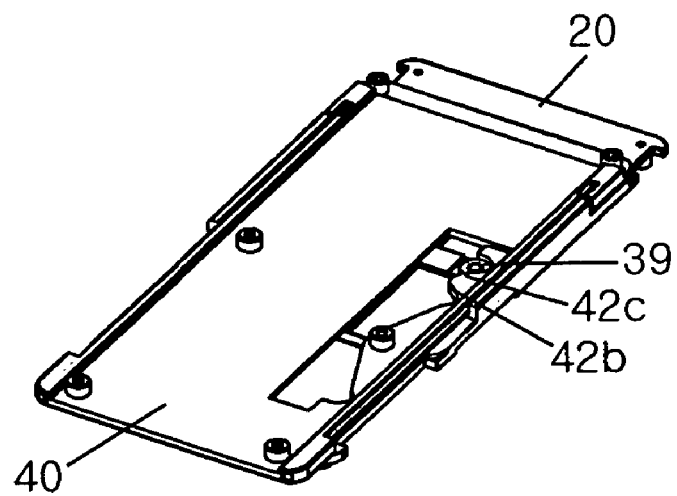

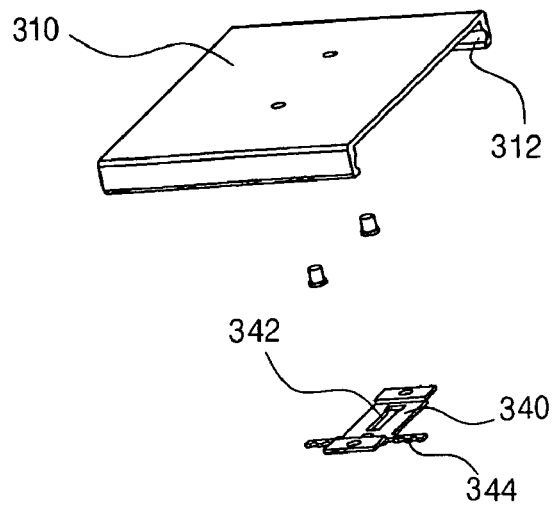
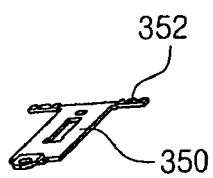
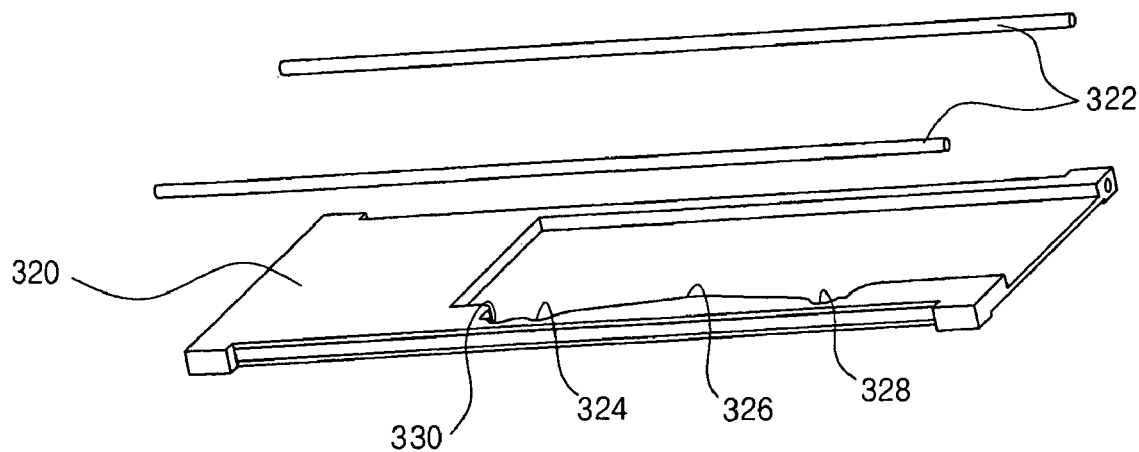
Fig. 41

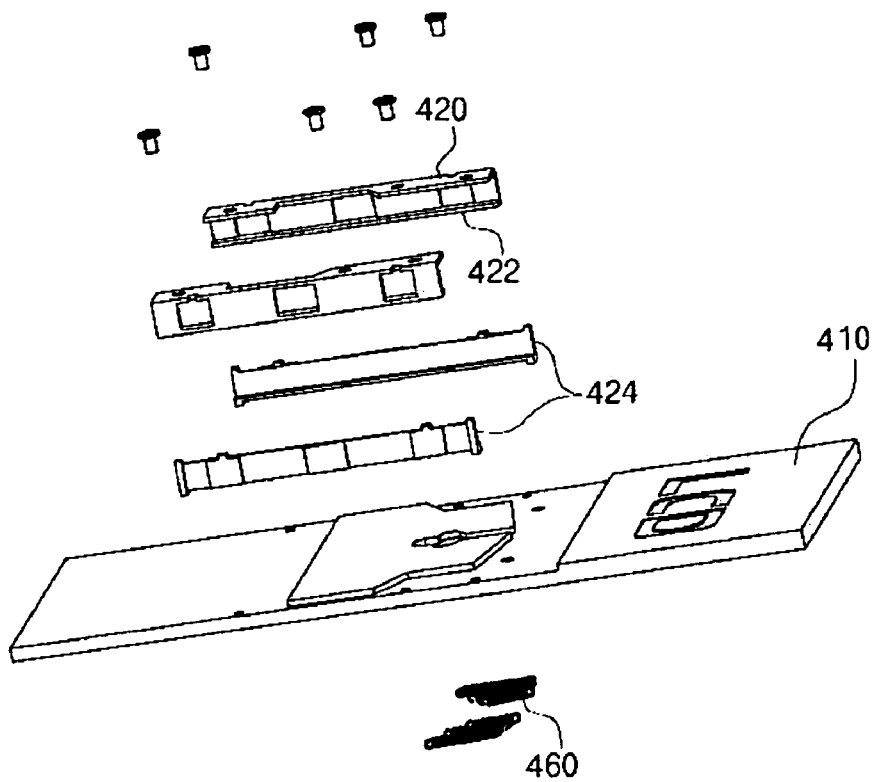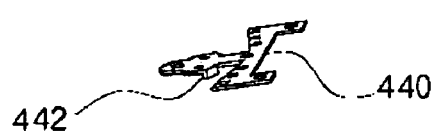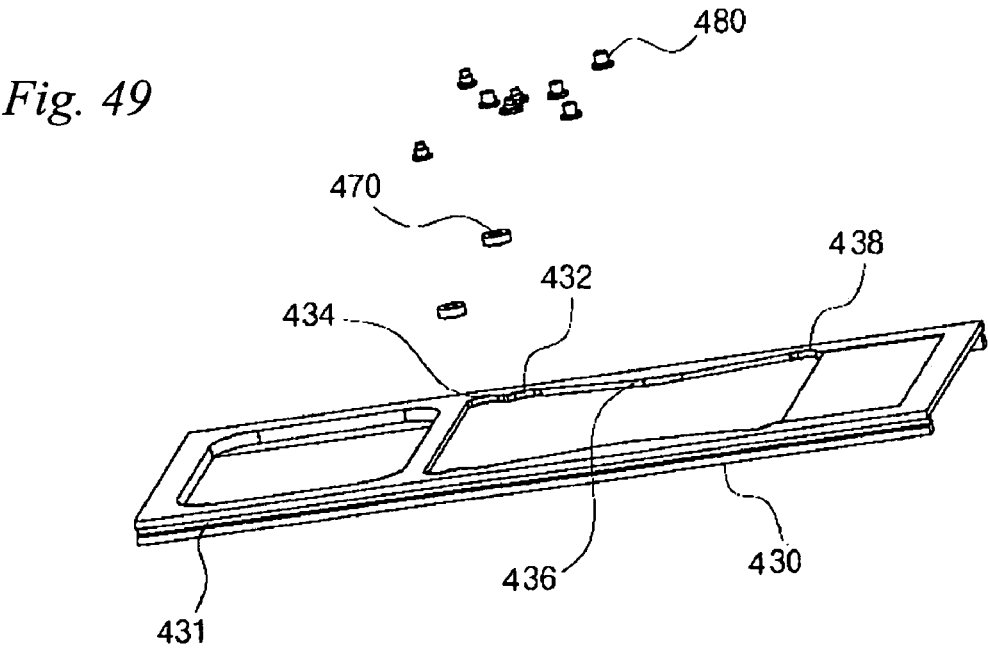
Fig. 49

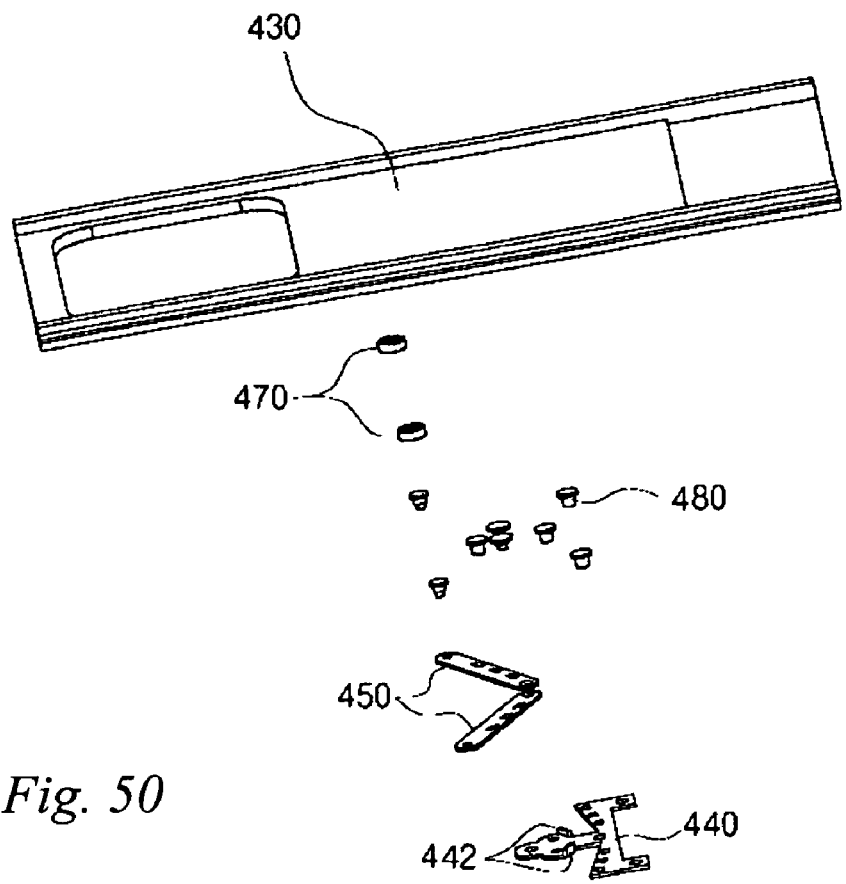
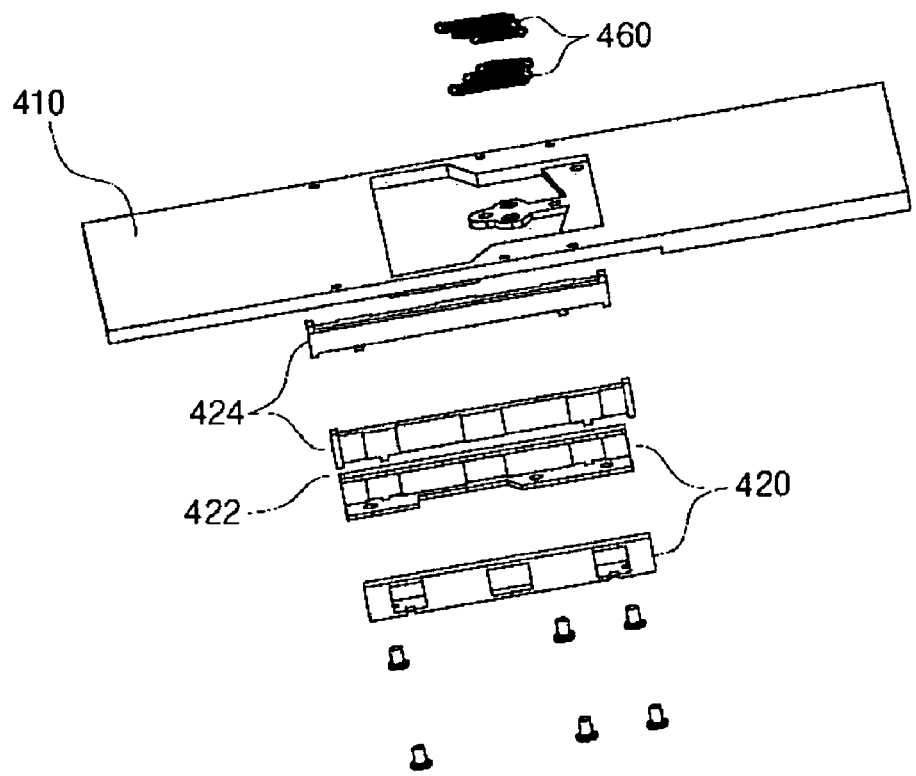
Fig. 50

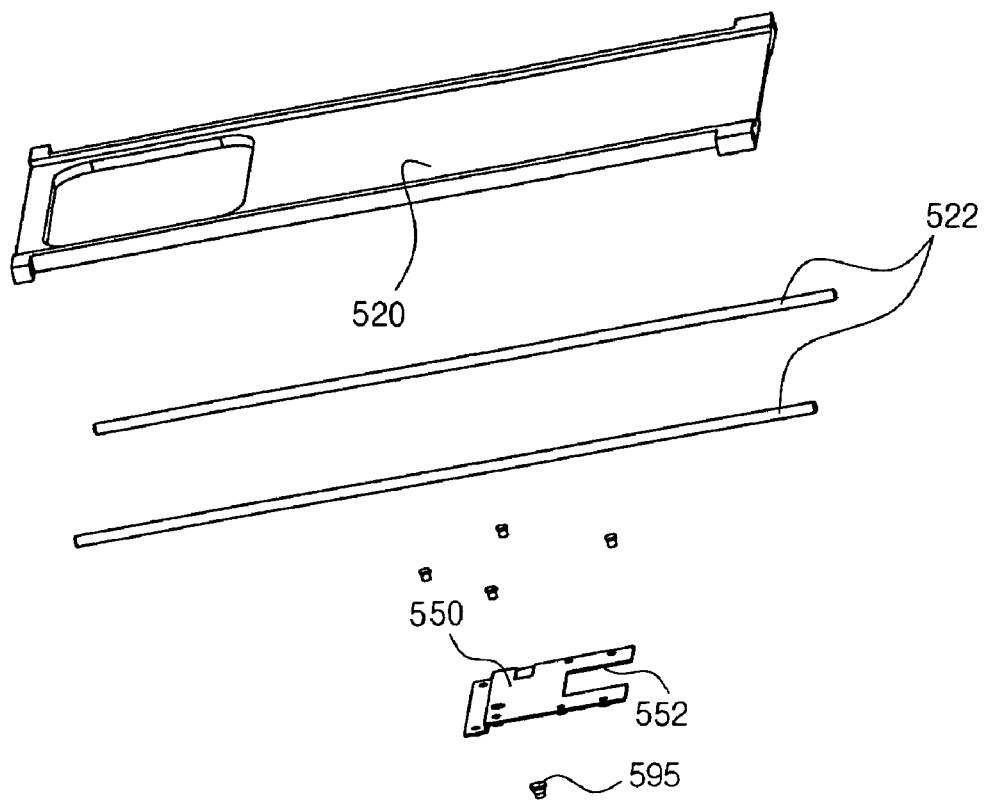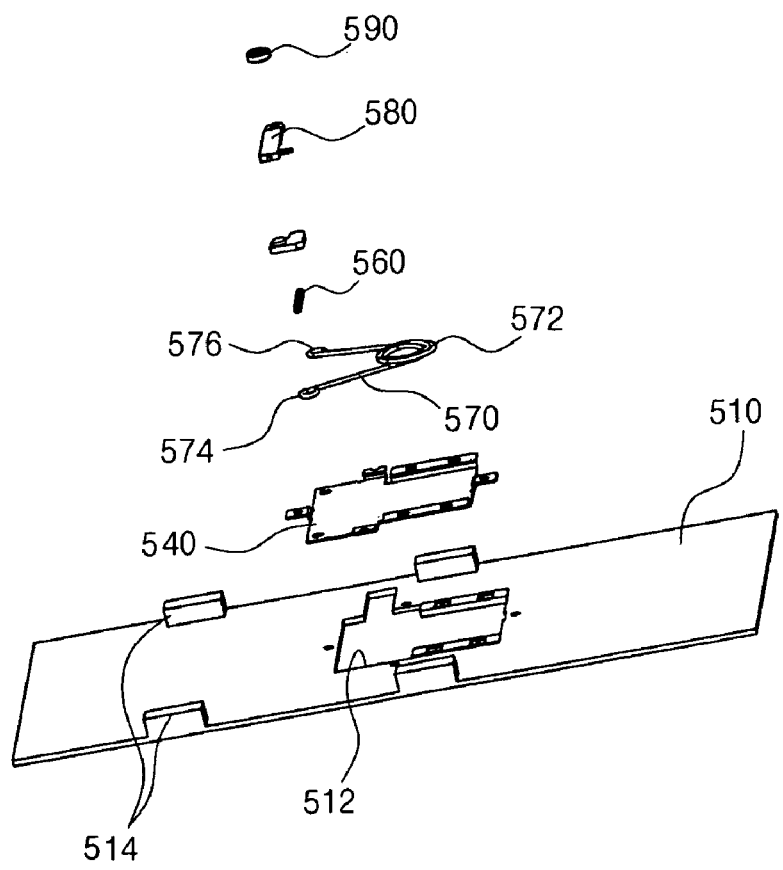
Fig. 58

SLIDING MECHANISM OF PORTABLE COMMUNICATION TERMINALS

CROSS-REFERENCE TO RELATED APPLICATIONS

This patent application is a U.S. non-provisional utility application which claims priority of Korean Application Nos. KR10-2005-0115379 filed Nov. 30, 2005 (now Korean Patent No. KR10-0698458, issued Mar. 15, 2007), KR10-2006-0035476 filed Apr. 19, 2006 (now KR10-0760857, issued Sep. 17, 2007), KR10-2006-0054326 filed Jun. 16, 2006 (now Korean Patent No. 10-0727621, issued Jun. 5, 2007), KR10-2006-0063655 filed Jul. 6, 2006 (now Korean Patent No. KR10-0727601, issued Jun. 5, 2007, KR10-2006-0066468 filed Jul. 14, 2006 (now Korean Patent No. 10-0736108, issued Jun. 29, 2007, KR10-2006-0067126 filed Jul. 18, 2006 (now Korean Patent No. 10-0738569, issued Jul. 5, 2007), KR10-2006-0067659 filed Jul. 19, 2006 (now Korean Patent No. 10-0789667, issued Dec. 21, 2007), and KR10-2006-0103813 filed Oct. 25, 2006 (now Korean Patent No. 10-0783627, issued Dec. 3, 2007).

BACKGROUND OF THE INVENTION

1. Field of the Invention

The present invention relates to a slider mechanism for portable communication terminals providing a smooth operation and an improved durability.

2. Background of the Related Art

Recently, as portable wireless terminals have been increasingly popularized, users need additional functions to accommodate their tastes even in opening and closing operations of the terminal, along with its inherent functions of wireless communications.

In response to these needs, portable terminals have developed into a general bar type, flip type, flip-up type, folder type, and the like. In recent years, the folder type has been used most widely.

This is because the folder type terminal has a space enough to adopt a wide LCD module as the display device and can be held in a half-folded state to thereby provide a good portability, as compared with other type terminals.

On the other hand, a slider type terminal has been introduced, which can be equipped with an LCD module display device having a similar size to the folder type. Simultaneously, the slider type can contribute to miniaturization of portable terminals.

This slider type terminal is structured such that a sub-body corresponding to a cover is slidably opened and closed on a main body, thereby providing additional advantages of slidably opening and closing, while maintaining advantages of the existing folder type terminal.

For example, Korean Utility Model Application No. 2003-0000136 discloses a slider-type portable wireless terminal.

The terminal disclosed in the above application includes a guide means for guiding a sub-body on a main body and at least one resilient means installed between the sub-body and the main body such that its resilient force can be exerted in opening or closing direction with respect to a certain sliding point of the sub-body. In addition, when the sub-body is completely opened and closed, it can remain in its opened or closed state due to the resilient means, without any separate stopper.

The resilient means employs a torsion spring, one end of which is fixed to the main body and the other end thereof is fixed to the sub-body.

In this terminal, one end of the torsion spring is fixed to the main body and the other end thereof is fixed to the sub-body, and thus the resiliency of the torsion spring is exerted over the whole moving distance of the sub-body. Thus, the torsion spring is compressed and stretched repeatedly over a wide range of amplitude. Therefore, the torsion spring expandable over a wide length is used, but this torsion spring has a smaller resilient force. In order to compensate for the deficient resilient force, two torsion springs are employed.

However the torsion spring is deformed in a wide range inherently and easily degraded due to fatigue caused by repeated operations. Thus, the torsion spring comes to lose its normal function or leads to a failure within a shorter period of time. Accordingly, the conventional slider type apparatus uses two torsion springs, which results in a complicated and difficult assembling process and a shortened service life.

SUMMARY OF THE INVENTION

Accordingly, the present invention has been made in order to solve the above problems in the prior art. It is an object of the invention to provide a slider mechanism for portable communication terminals, which can slidably open or close the terminals in a smooth manner and has an improved durability.

In an embodiment of the invention, there is provided a slider mechanism for slidably opening and closing a portable communication terminal, the slider mechanism comprising: a first plate; a second plate slidably combined with the first plate, the second plate having a cam profile formed along siding direction; and a resilience unit mounted on the first plate to exert resilient force perpendicularly to moving direction of the second plate, wherein the resilience unit includes a housing to be mounted on the first plate, a slider slidably disposed inside the housing, a spring disposed between the housing and one end of the slider, and a roller attached to the other end of the slider and sliding along the cam profile.

In an embodiment of the invention, there is provided with a slider mechanism for slidably opening and closing a portable communication terminal, the slider mechanism comprising: a first plate; a second plate slidably combined to the first plate in parallel thereto, the second plate having a cam profile formed of consecutive depression and slant plane along sliding direction; a slider housing fixed to the first plate; a mobile block mounted on the slider housing so as to move towards and far away from the cam profile; one or more compression springs supported on the slider housing and exerting resilient force on the mobile block; and a roller rotatably installed in the mobile block to rotatably contact the cam profile.

In an embodiment of the invention, there is provided a slider mechanism for slidably opening and closing a portable communication terminal, the slider mechanism comprising: a first cover; a second cover slidably combined with the a first cover; a guide member for guiding such that the second cover can move straight and along a longitudinal direction the first cover; and a plunger assembly disposed between the first cover and the second cover and for stopping the second cover at a desired position during sliding of the second cover, wherein the plunger assembly includes a housing member having an open end; a plunger slidably inserted into the housing member, a roller being rotatably attached to one end of the plunger and an insert shaft being formed at the other end of the plunger along a longitudinal direction of the plunger; and a compressive spring inserted into the insert shaft and resiliently supporting the plunger, wherein a latching groove is formed at the bottom of the plunger and extended along a longitudinal direction of the plunger, and a stopper is protruded at the bottom of the housing member, the stopper being inserted into the latching groove to limit movement of the plunger.

In an embodiment of the invention, there is provided a slider mechanism for slidably opening and closing a portable communication terminal, the slider mechanism comprising: a first plate; a second plate slidably combined with the first plate in parallel thereto, the second plate including a cam profile of consecutive depression and slant plane formed along sliding direction; a fixing lever fixed to the first plate; a sliding lever disposed so as to move towards and far away from the cam profile, the sliding lever face-contacting the fixing lever; at least one tension spring for providing resilient force to advance the sliding lever towards the cam profile, one end of the tension spring being connected to one end of the fixing lever and the other end thereof being connected to an end of the sliding lever facing the one end of the fixing lever; and a roller rotatably attached to the sliding lever so as to contact and roll on the cam profile.

In an embodiment of the invention, there is provided a slider mechanism for slidably opening and closing a portable communication terminal, the slider mechanism comprising: a first plate; a second plate slidably combined with the first plate in parallel thereto, the second plate including a cam profile formed along the sliding direction, the cam profile having consecutive depression and slant plane; a fixing frame fixed to the first plate; a pivot lever, a first end of which is pivotably hinge-connected to the fixing frame and the second end of which moves towards and far away from the cam profile due to pivot motion; at least one tension spring, one end of which is fixed to the fixing frame and the other end of which is fixed to the pivot lever, the tension spring generating a tension force for the second end to be biased towards the cam profile; and a roller provided in the second end of the pivot lever, the roller contacting and rolling on the cam profile.

In an embodiment of the invention, there is provided a slider mechanism for slidably opening and closing a portable communication terminal, the slider mechanism comprising: a first plate; a second plate slidably combined with the first plate in parallel thereto, the second plate including a cam profile formed along the sliding direction, the cam profile having consecutive depression and slant plane; a slide housing fixed to the first plate; a slide shaft installed inside of the slide housing so as to move towards and far away from the cam profile; a compressive spring exerting resilient force on the slide shaft within the slide housing; a torsion spring exerting resilient force on the slide shaft together with the compressive spring within the slide housing; and a roller rotatably installed in the slide shaft so as to contact and roll on the cam profile.

In an embodiment of the invention, there is provided a slider mechanism for slidably opening and closing a portable communication terminal, the slider mechanism comprising: a first plate having a cam profile, the cam profile having a depression formed at a desired position; a second plate slidably combined with the first plate; a torsion spring for generating an expansion force; a slide shaft coupled to one end of the torsion spring; a case member fixed to the second plate, the case member accommodating the torsion spring and the slide shaft and guiding the slide shaft to move towards and far away from the cam profile; and a roller rotatably installed in the slide shaft, the roller rolling along the cam profile.

BRIEF DESCRIPTION OF THE DRAWINGS

Further objects and advantages of the invention can be more fully understood from the following detailed description taken in conjunction with the accompanying drawings in which:

FIGS. 9 and 10 are perspective views showing operation of the slider mechanism and a portable terminal equipped with the slider mechanism according to the first embodiment of the invention;

FIGS. 41 and 42 are exploded perspective views of a slider mechanism according to a fourth embodiment of the invention;

FIGS. 49 and 50 are exploded perspective views of a slider mechanism according to a fifth embodiment of the invention;

FIGS. 58 and 59 are exploded perspective views of a slider mechanism for portable terminals according to the invention;

DETAILED DESCRIPTION OF THE PREFERRED EMBODIMENTS

Exemplary embodiments of the present invention will be hereafter described in detail with reference to the accompanying drawings.

Figure 1:
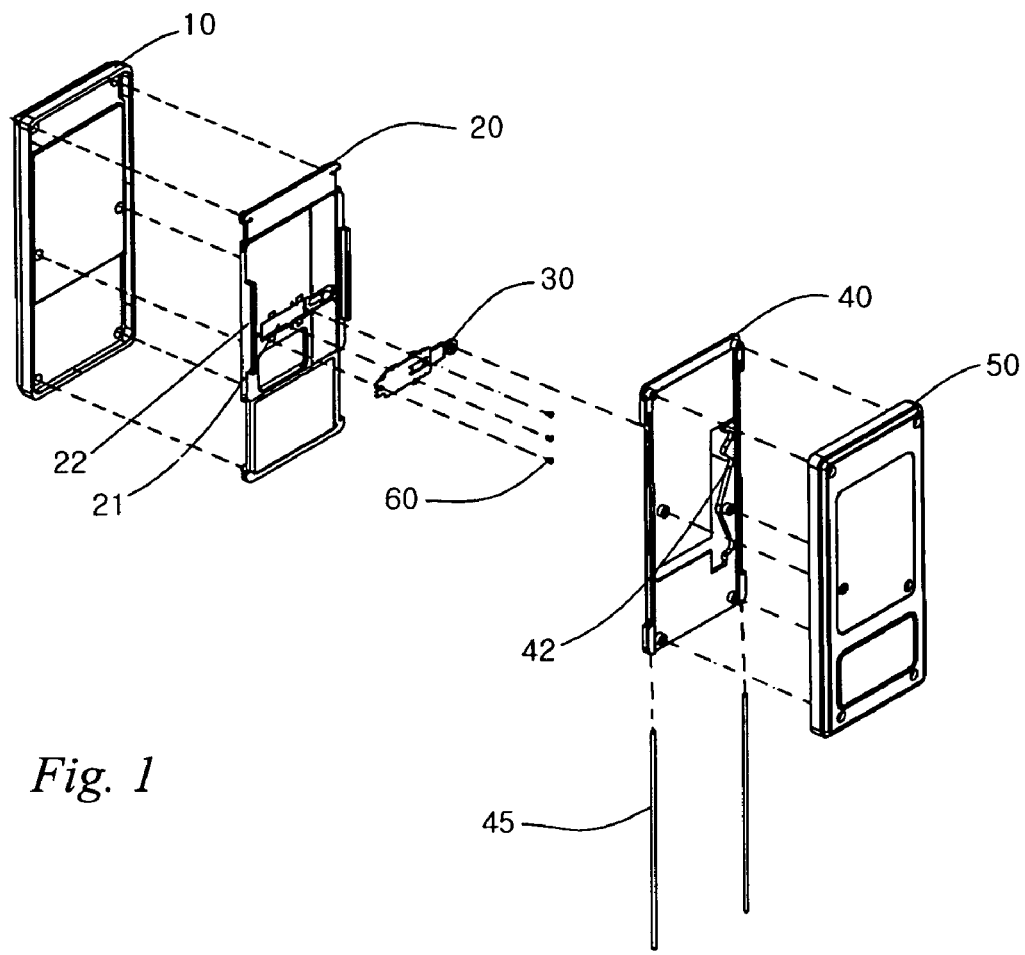
FIGS. 1 and 2 are perspective views illustrating a portable communications terminal according to a first embodiment of the invention.
Figure 2:
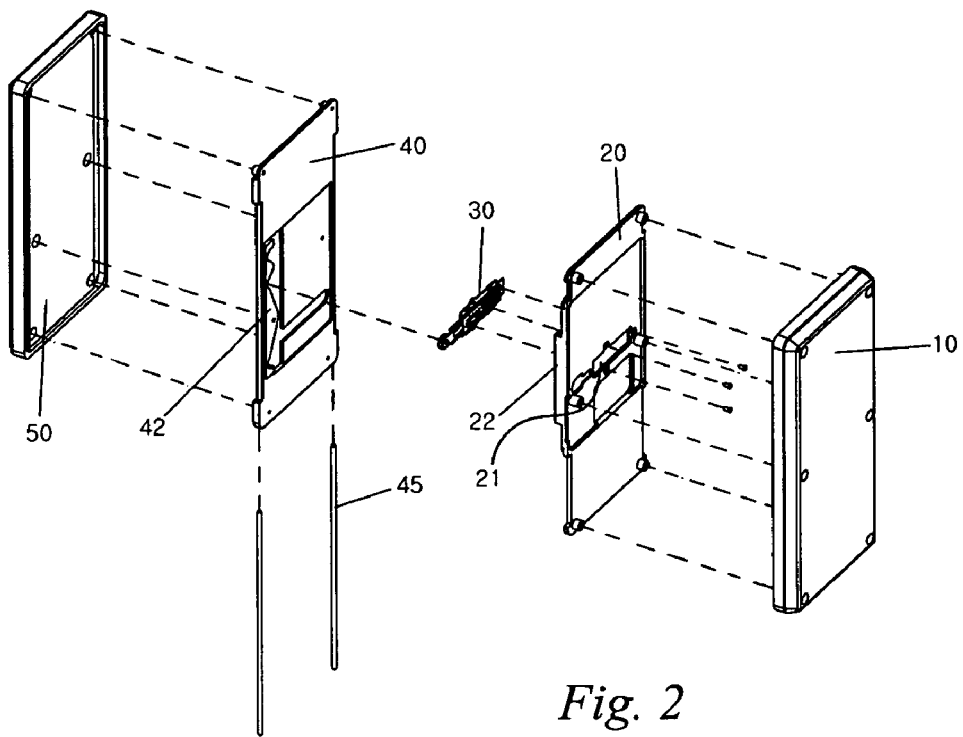
Figure 3:
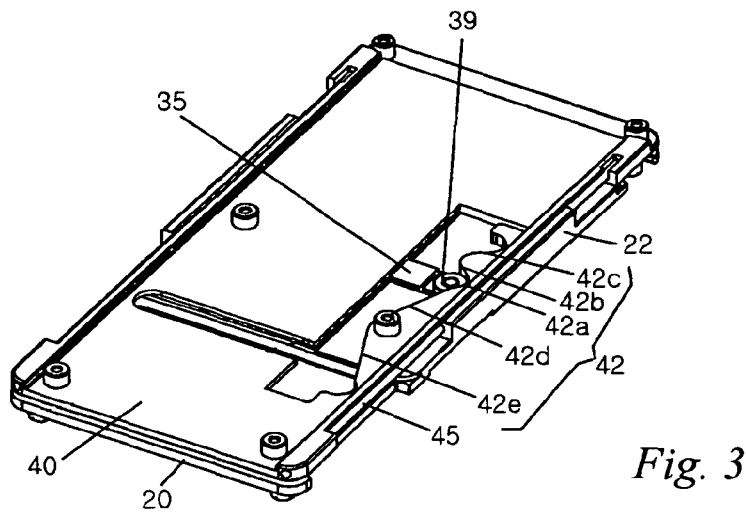
FIG. 3 is a perspective view showing a slider mechanism according to the first embodiment of the invention.
Figure 4:
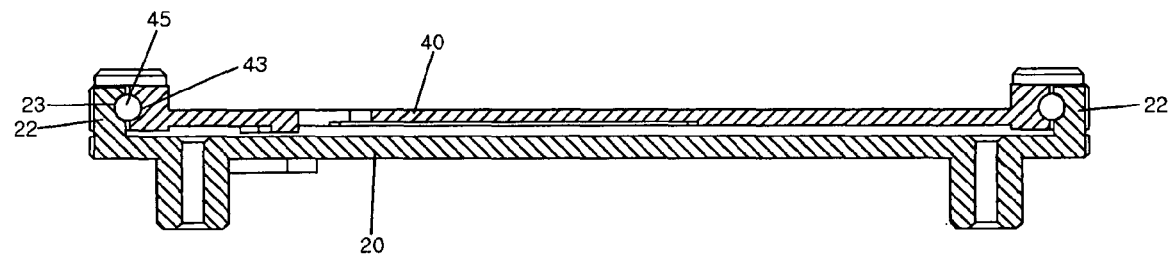
FIG. 4 is a transversal cross-section of FIG. 3.

FIGS. 1 and 2 are perspective views illustrating a portable communications terminal (hereinafter, referred to as a "portable terminal") according to a first embodiment of the invention. FIG. 3 is a perspective view showing a slider mechanism according to the first embodiment of the invention. FIG. 4 is a transversal cross-section of FIG. 3.

As illustrated in FIGS. 1 to 3, the slider mechanism of portable terminals includes a first plate 20, a second plate 40 and a resilience unit 30.

The first plate 20 is combined with a main body 10, and the second plate 40 is connected with a display unit 50. The second plate 40 and the first plate 20 are combined with each other so as to be able to slide against each other.

The resilience unit 30 is mounted on the first plate 20 by means of a connection means such as a rivet 60 so as to be disposed between the first plate 20 and the second plate 40.

Here, the resilience unit 30 is disposed perpendicular to the moving direction of the second plate 40. Thus, the resilient member 30 exerts its resilient force perpendicularly to the moving direction of the second plate 40.

In order for the second plate 40 to be able to slide, as shown in FIGS. 1 to 4, the first plate 20 is provided with a lateral guide 22 formed at both lateral sides, i.e., protruded at the central portion of each lateral side of the first plate 20 such that the lateral guides 22 are contacted with both lateral sides respectively of the second plate 40.

As shown in FIG. 4, the second plate 40 is provided with a second retainer groove 43 formed at both lateral sides along the moving direction of the second plate 40. Formed in the lateral guide 22 of the first plate is a first retainer groove 23 corresponding to the second retainer groove 43. A guide rod 45 is disposed between the first and second retainer grooves 23 and 43.

That is, the guide rod 45 has a circular cross-section, and the first and second retainer grooves 23 and 43 have a half-circular cross-section to form a circular together, inside of which the guide rod 45 can be received.

Thus, the second plate 40 is combined with the first plate 20 by means of the guide rod 45. The second retainer groove 43 of the second plate 40 moves along the guide rod 45 such that the second plate 40 can slide against the first plate 20.

The first plate 20 is provided with an opening 21 into which the resilience unit 30 can be inserted and mounted thereon. The second plate 40 is provided with a cam profile 42 formed inner side thereof. The resilience unit 30, specifically, a roller of the resilience unit 30 contacts the cam profile 42 along the moving direction of the second plate 40.

The resilience unit 30 is inserted into the opening 21 formed in the first plate 20. Thus, when the first and second plates 20 and 40 are assembled, the thickness of the slider mechanism can become thinner as much as the thickness of the resilience unit 30, consequently enabling a slim portable terminal.

Referring to FIG. 3, the cam profile 42 is composed of a plurality of slant planes formed at the inner edge of the second plate 40. The slant planes are disposed at different orientations, i.e., in a zigzag pattern along the moving direction of the second plate 40.

More specifically, the slant planes are placed at the upper and lower side of a concave reference position 42a.

The upper side slant planes include a first upper slant plane 42b and a second upper slant plane 42c. One end of the first upper slant plane 42b is the reference position 42a and the other end thereof is formed to be inclined to the upper-left side. One end of the second upper slant plane 42c meets the first upper slant plane 42b and the other end thereof is extended to the upper-right side.

The lower side slant planes include a first lower slant plane 42d and a second lower slant plane 42e. One end of the first lower slant plane 42d is the reference position 42a and the other end thereof is formed towards the lower-left side. The second lower slant plane 42e meets the first lower slant plane 42d and the other end thereof is extended to the lower-right direction.

At this time, the one ends of the first upper slant plane 42b and the first lower slant plane 42d are the same position as the reference position 42a. Preferably, the reference position 42a, the other ends of the second upper slant plane 42c and the second lower slant plane 42e are formed at a same distance from the lateral edge of the second plate 40.

Figure 5:
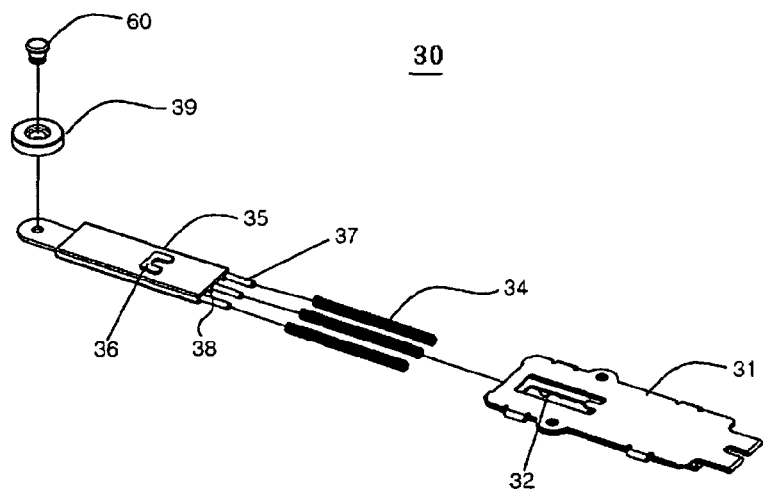
FIG. 5 is an exploded perspective view of a resilience unit according to an embodiment of the invention.
Figure 6:
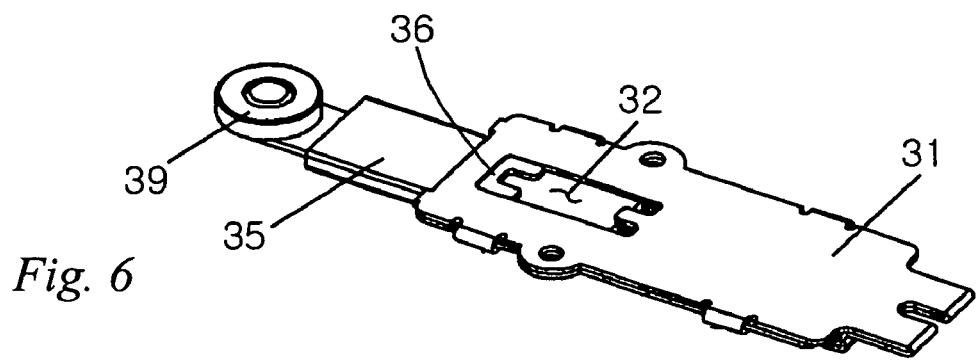
FIGS. 6 and 7 are perspective views showing operation of the resilience unit of FIG. 5.
Figure 7:
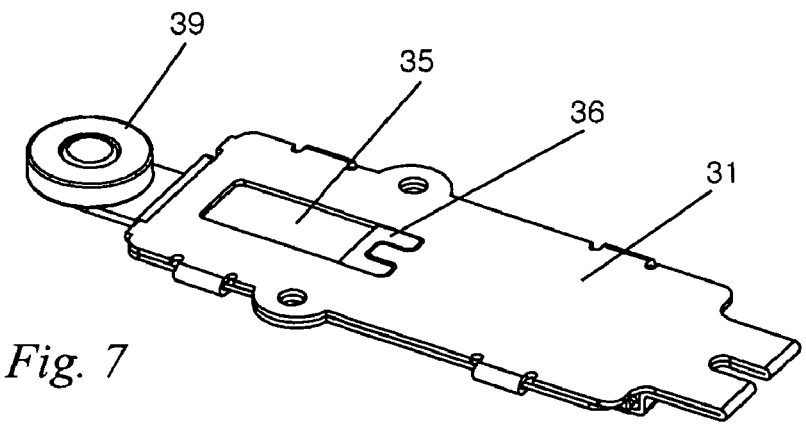
Figure 8:
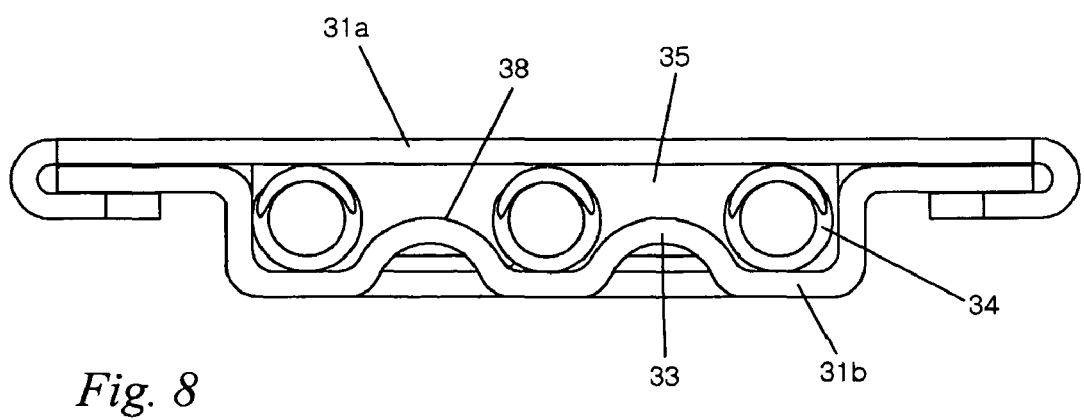
FIG. 8 is a transversal cross-section of FIG. 6.

FIG. 5 is an exploded perspective view of a resilience unit 30 according to an embodiment of the invention. FIGS. 6 and 7 are perspective views showing operation of the resilience unit 30 of FIG. 5. FIG. 8 is a transversal cross-section of FIG. 6.

Referring to FIGS. 3 and 5 to 8, the resilience unit 30 includes a housing 32 being mounted into the opening 21 of the first plate 20, a slider 35 disposed slidably inside the housing 31, a spring 34 disposed between the housing 31 and one end of the slider 35 within the housing 31, and a roller 39 attached to the other end of the slider 35 so as to run on and along the cam profile 42.

The housing 31 is provided with a slot formed on top face thereof and the slider 35 has a protrusion 36 formed on top face thereof so as to slide within and along the slot 32.

The protrusion 36 slides along the slot 32 such that the slider 35 can be prevented from wobbling. The protrusion 36 moves within the slot 32 to thereby serve as a stopper for restricting the moving range of the slider 35. In addition, the protrusion 36 is protruded to prevent the slider 35 from being easily released from the housing 31.

In addition, formed at one end of the slider is a spring supporter 37 protruded so as to support the spring 34.

As shown in FIG. 8, a spring supporter 33 is formed on the bottom of the housing 31. The spring supporter 33 is protruded so as to support the lateral side of the spring 34 along the moving of the slider 35.

Therefore, when the slider 35 compresses the spring 34, the lateral side of the spring 34 is supported by the spring supporter 33 and thus prevented from bending sideway.

The spring supporter 33 is formed preferably by bending up and down the bottom face of the housing 31.

In addition, as shown in FIGS. 5 and 8, formed under the slider 35 is a sliding groove 38, which corresponds to the spring supporter 33.

Thus, when the slider 35 moves, it is guided by the spring supporter 33 and can slide forwards and backwards only without wobbling to the left and right.

Referring to FIG. 8, the housing is comprised of an upper plane member 31a and a lower plane member 31b. The spring supporter 33 is formed in the lower plane member 3b and the spring 34 is placed between the spring supporters 33. Then, the slider 35 having the roller 39 is inserted into the housing and thereafter the upper plane member 31a is combined with the lower plane member 31b by pressing their lateral edges, etc.

At this time, as described above, since the protrusion 36 is latched within the slot 32, the slider 35 is not released from the housing 31.

The roller 39 is rotatably attached to one end of the slider 35 using a rivet 60 or the like. At this time, the roller 39 is attached so as to protrude towards the cam profile 42.

As described above, the resilience unit 30 is pre-assembled to form a piece of part. Thus, the resilience unit 30 can be easily mounted on the first plate 20 to thereby shorten assembling time, along with easy assembling of the resilience unit 30 itself.

Figure 9:
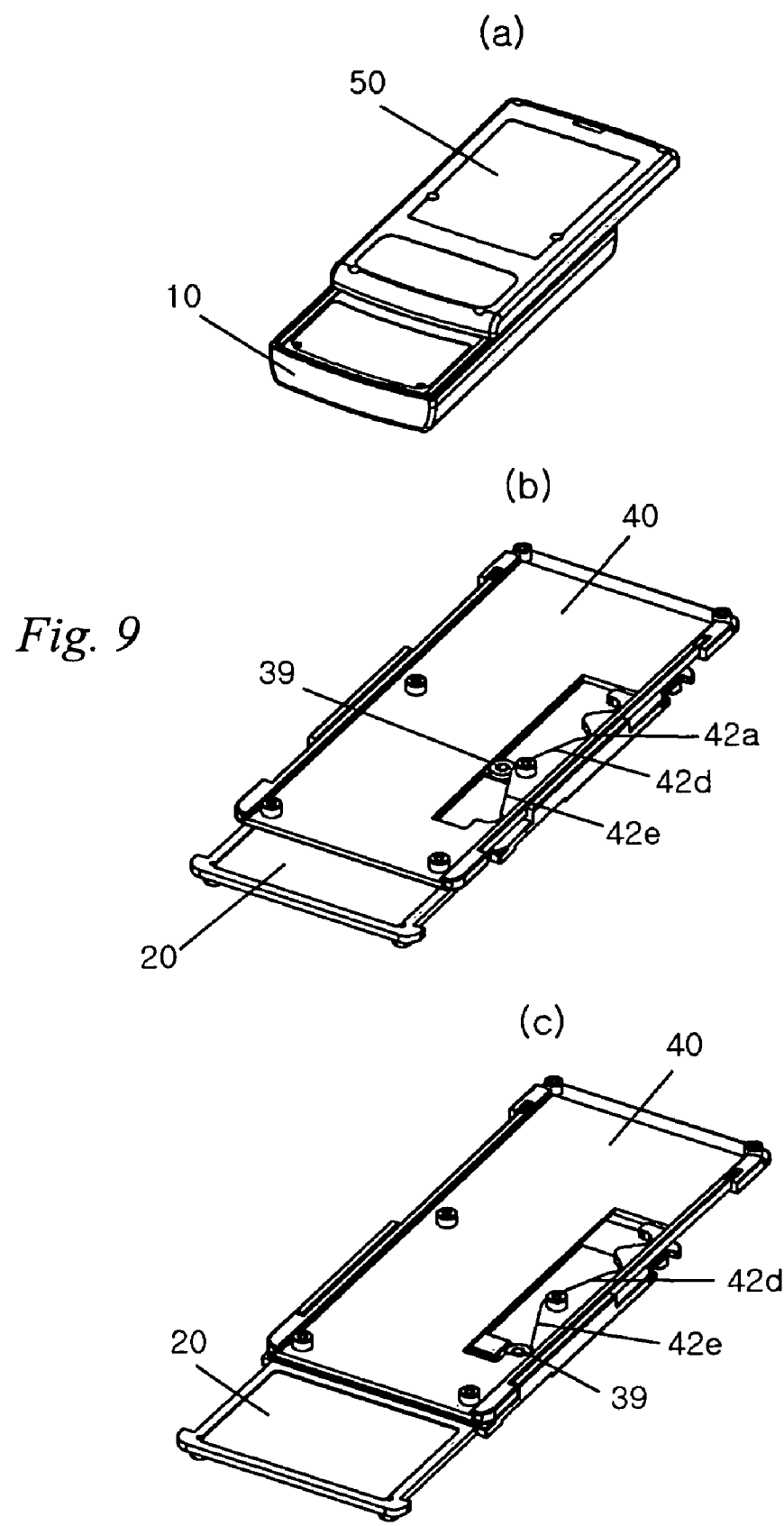

FIGS. 9 and 10 are perspective views showing operation of the slider mechanism and a portable terminal equipped with the slider mechanism according to the first embodiment of the invention.

Referring to FIG. 3, the roller 39 rests on the reference position 42a before the second plate 40 moves.

At this time, the resilient force of the resilience unit 30 is exerted perpendicular to the second plate 40, which does not move upwards or downwards without any external action.

As shown in FIG. 9a, when the display unit 50 is moved up, the second plate 40 also moves upwards. At this time, as shown in FIG. 6b, the first lower slant plane 42d of the second plate 40 moves upward while pushing the roller 39 inwardly.

If the roller 39 passes slightly beyond a transition point between the first lower slant plane 42d and the second lower slant plane 42e, the roller 39 slides down along the second lower slant plane 42e without any further force by a user, due to the resilient force of the resilience unit 30. Then, as shown in FIG. 9c, the second plate 40 is completely opened upwardly.

As described above, similarly, the second plate 40 does not arbitrarily move up and down because the resilient force of the resilience unit 30 exerts perpendicular to the second plate 40.

As shown in FIG. 10a, if the display unit 50 is moved downwards, the second plate 40 is also moved down. At this time, as shown in FIG. 10b, the first upper slant plane 42b of the second plate 40 moves down while pushing the roller 30 inwards.

If the roller 39 passes slightly beyond a transition point between the first upper slant plane 42b and the second upper slant plane 42c, the roller 39 slides down along the second upper slant plane 42c without any further force by a user, due to the resilient force of the resilience unit 30. Then, as shown in FIG. 10c, the second plate 40 is completely opened downwardly.

Similarly, the second plate 40 does not arbitrarily move up and down because the resilient force of the resilience unit 30 exerts perpendicular to the second plate 40.

As described above, the resilience unit 30 is disposed perpendicular to the second plate 40 so that its resilient force is more effectively exerted on the cam profile 42. Thus, the number of the resilience units can be reduced and the spring can be compressed without distortion to thereby extend the service life thereof.

Further, due to the cam profile and resilience unit, the display unit of the portable terminal can be automatically opened or closed by only exerting an initializing force.

Hereafter, a slidably opening and closing apparatus according to a second embodiment of the invention will be explained, with reference to the accompanying drawings.

Figure 11:
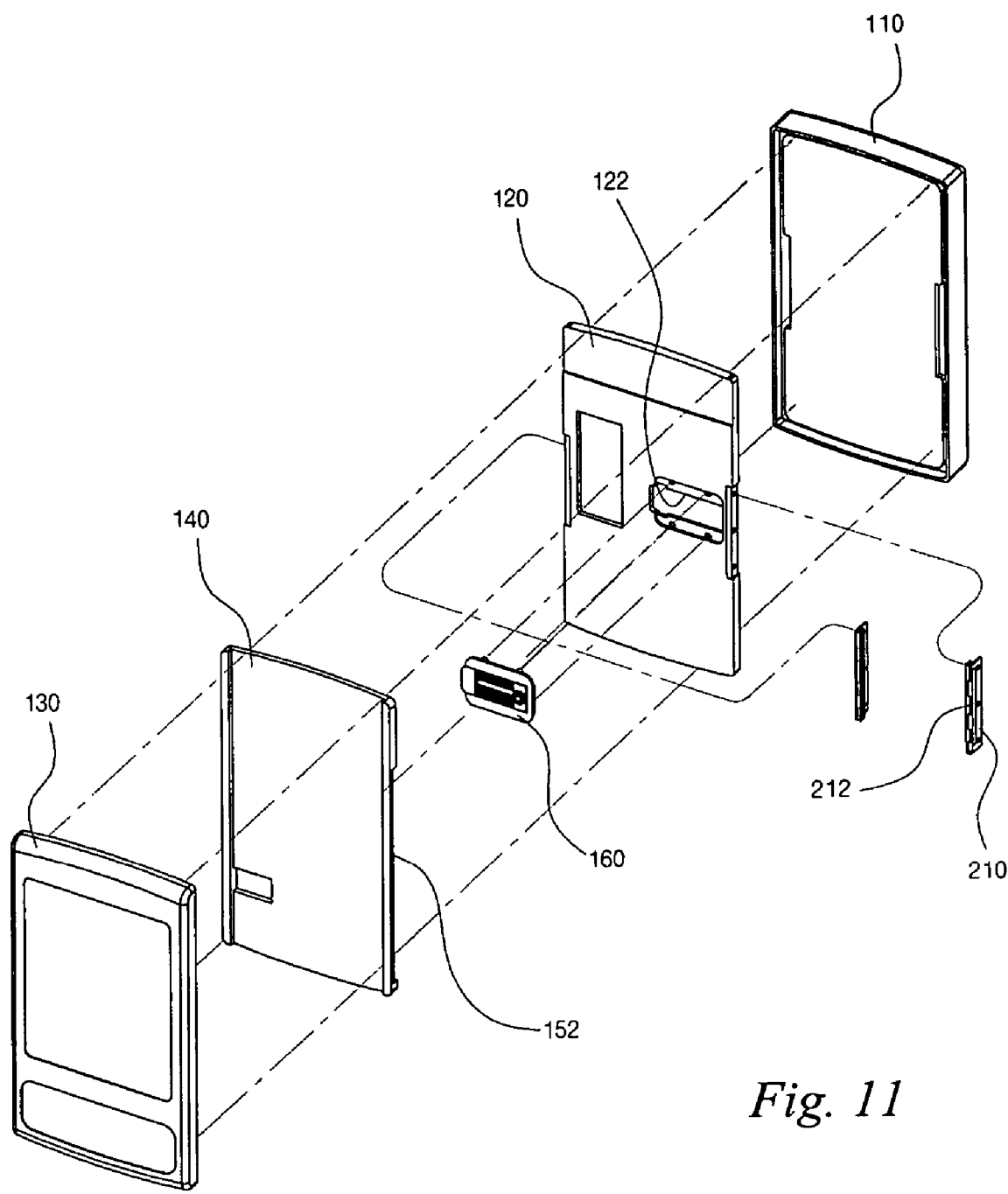
FIG. 11 is an exploded perspective view of a portable terminal according to a second embodiment of the invention.
Figure 12:
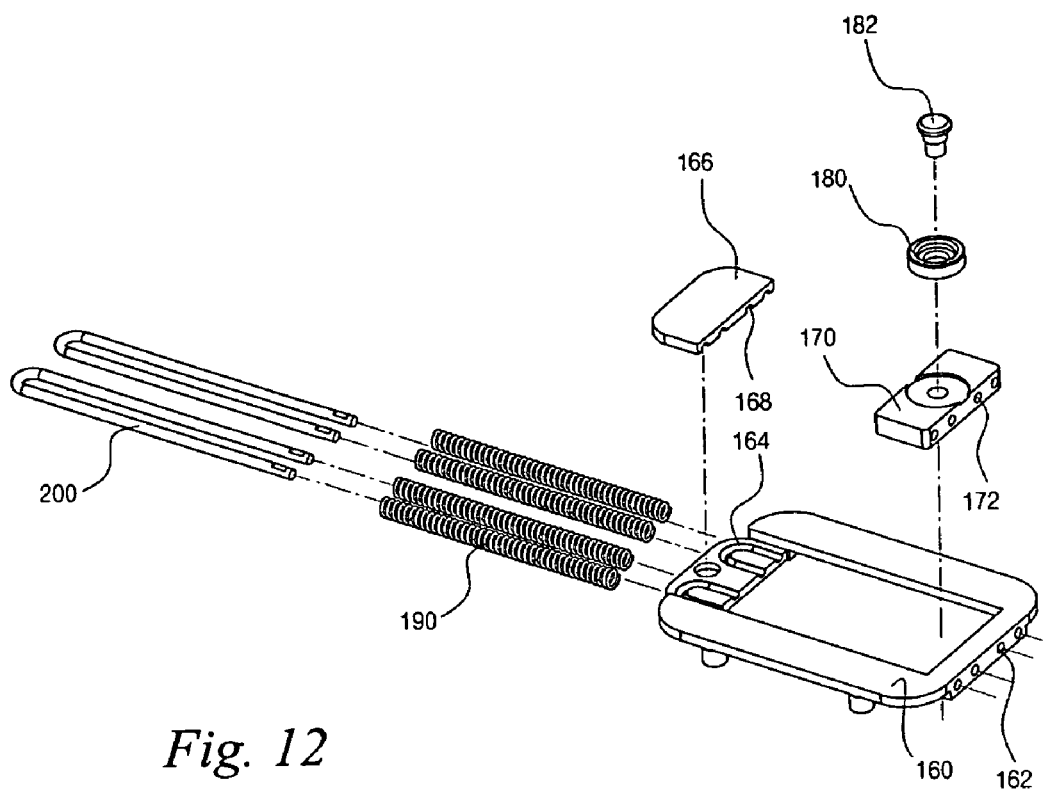
FIG. 12 is an exploded perspective view of a slider mechanism of FIG. 11.
Figure 13:
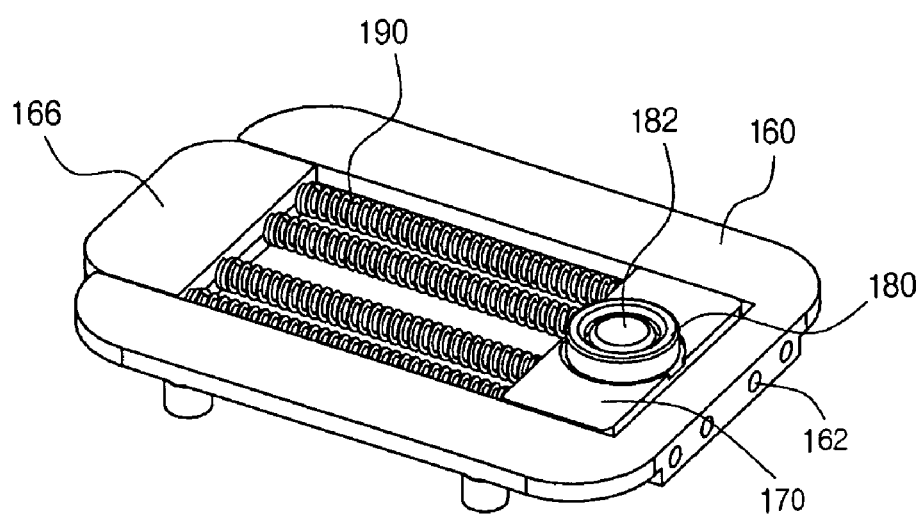
FIG. 13 shows a perspective view of the assembled slider mechanism of FIG. 12.
Figure 14:
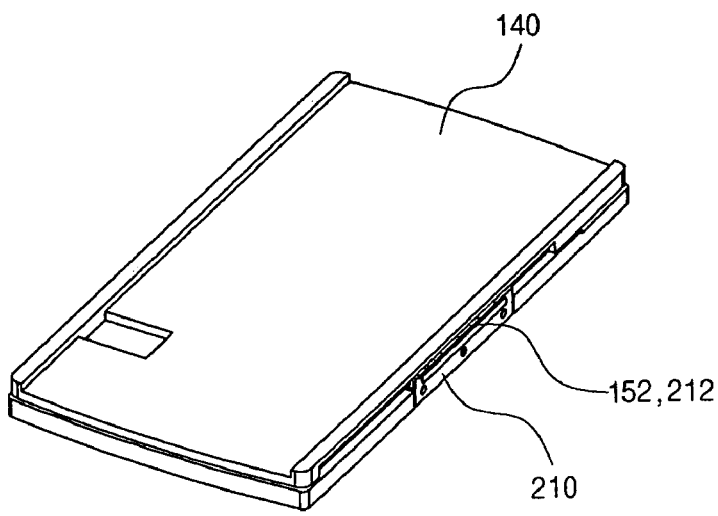
FIGS. 14 and 15 are perspective views showing partially assembled portable terminal of FIG. 11.
Figure 15:
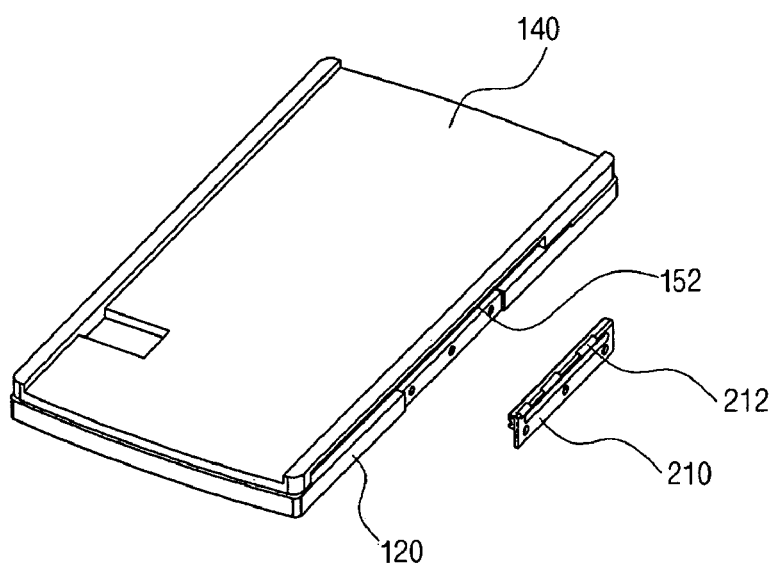

FIG. 11 is an exploded perspective view of a portable terminal according to a second embodiment of the invention. FIG. 12 is an exploded perspective view of a slider mechanism of FIG. 11. FIG. 13 shows a perspective view of the assembled slider mechanism of FIG. 12. FIGS. 14 and 15 are perspective views showing partially assembled portable terminal of FIG. 11.

The slider mechanism of this embodiment combines a sub-body 130 and a main body of a portable terminal with each other so as to be able to slide against each other. The slider mechanism includes a first plate 120 to be fixed to the main body 110 and a second plate 140 to be fixed to the sub-body 130. The second plate 140 is slidably combined with the first plate 120 in parallel thereto. The second plate 140 is provided with a cam profile including consecutive depressions and slant planes 144 formed along the sliding direction. The slider mechanism includes a slider housing 160 to be fixed to the first plate 120, a mobile block 170 to be installed in the slider housing 160 so as to move towards and away from the cam profile, a plurality of compressive springs 190 supported on the slider housing 160 and exerting resilient force to the mobile block 170, and a roller 180 installed in the mobile block 170 so as to rotatably contact the cam profile.

Two U-shaped guide shafts 200 are fixed to the slider housing 160 and the mobile block 170 has a second through-hole 172 formed such that the guide shaft 200 can be slidably inserted into the second through-hole 172 and the mobile block 170 can move along the guide shaft 200. Four compressive springs 190 are inserted into the respective guide shaft 200.

The slider housing 160 is provided at its one end with first holes 162 formed to combine one ends of the guide shafts 200. Formed at the other end of the slider housing 160 is a first bent groove 164 where the U-bend of the guide shaft 200 is inserted. A plate 166 is connected to the slider housing 160 to thereby hold the U-bend portion of the guide shaft 200. The plate 166 has a second bent groove 168 facing the first bent groove 164.

Referring to FIGS. 16 to 20, the cam profile of the second plate 140 includes a first depression 142 at the central area of the cam profile, a second depression 146 at one side of the first depression 142 and a third depression 150 at the other side of the first depression. Formed between the first depression 142 and the second depression 146 is a slant plane having a mountain-like shape. A flat stop-free region 148 is formed between the first depression 142 and the third depression 150.

The roller 180 is rotatably attached to the mobile block 170 using a rivet 182. The roller 180 rotates along the cam profile when the second plate 140 moves, thereby reducing friction force.

When the roller 180 rests on the first depression 142, the sub-body 130 is closed on the main body 110. When the roller 180 rests on the second depression 146, the sub-body 130 is opened upwardly on the main body 110. When the roller 180 rests on the third depression 150, the sub-body 130 is opened downwardly on the main body 110.

When the roller 180 moves up the up-slope of the slant plane 144, the resilient force of the compression spring 190 resists the movement of the second plate 140. When the roller 180 moves down the down-slope of the slant plane 144 beyond its transition point, the second plate 140 automatically moves down due to resiliency of the compression spring 190.

In addition, when the roller 180 runs the stop-free region 148, the resiliency of the compression spring 190 does not affect the movement of the second plate 140. Thus, when the roller 180 rests on the stop-free region 148, the second plate 140 can stop moving.

Referring to FIG. 11 again, the first plate 120 is provided with an opening 122, into which the slider housing 160 is inserted and fixed to the first plate 120 such that the roller 180 is protruded above the first plate 120, thereby enabling to reduce the entire thickness of the slider mechanism.

A first guide rib 152 is formed at both lateral sides of the second plate 140. A pair of track guides 210 is fixed to both lateral sides of the first plate 120. The track guide 210 is provided with a second guide rib 212 formed so as to be slidably combined with the first guide rib 152. Thus, the first and second plates 120 and 140 can slide against each other.

The track guide 210 is fixed to the first plate 120 using a screw. The track guide 210 is manufactured by inserting a metallic pressed piece into an injection-molded plastic. Thus, the outer face of the track guide 210 is formed of a molded plastic to thereby reduce friction with the second plate 140. The inner pressed metallic structure reinforces rigidity of the track guide 210.

Hereafter, operation of the above-configured slider mechanism will be explained.

FIGS. 16 to 20 are perspective views explaining operations of the slider mechanism shown in FIG. 11. FIG. 21 is a perspective view showing operations of the portable terminal of FIG. 11.

Figure 16:
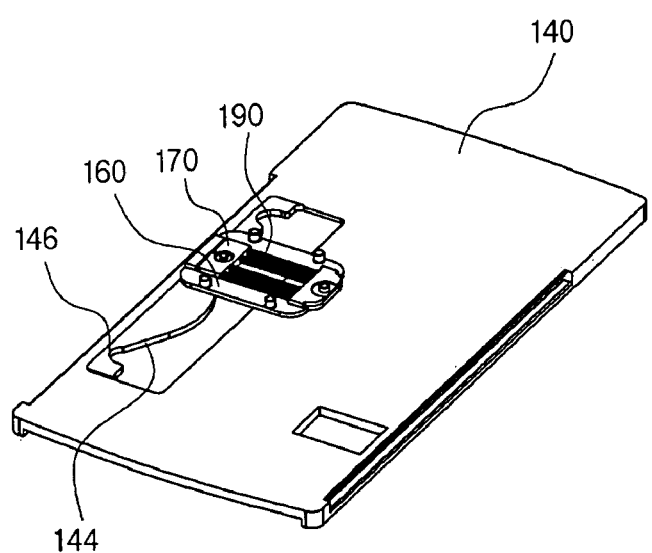
FIGS. 16 to 20 are perspective views explaining operations of the slider mechanism shown in FIG. 11.

Referring to FIG. 16, when the sub-body 130 is closed on the main body 110, the mobile block 170, i.e., the roller 180 attached thereto is biased to and remains at the first depression 142 due to resiliency of the compression spring 190.

Figure 17:
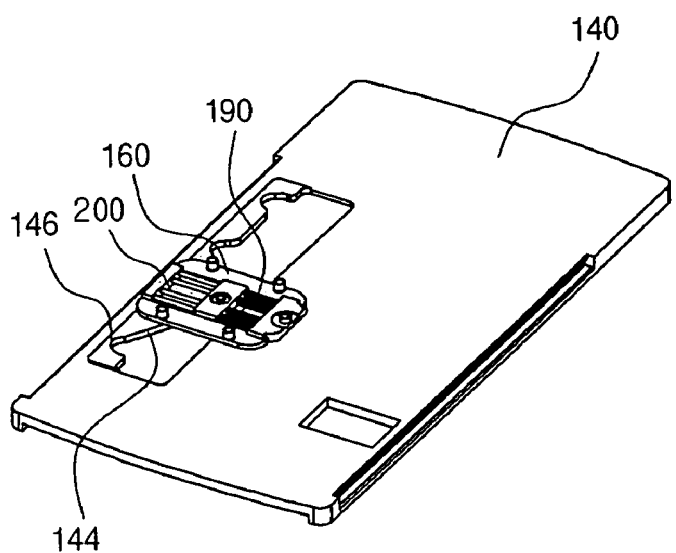

Referring to FIG. 17, if the sub-body is moved up, the roller 180 is released from the first depression 142 and passes through the slant plane 144. When the roller 180 moves up along the up-slope of the slant plane 144, the compression spring 190 acts to resist the movement. However, if the roller 180 passes through the transition point, the second plate 140 is automatically opened due to resilient force of the compression spring 190.

Figure 18:
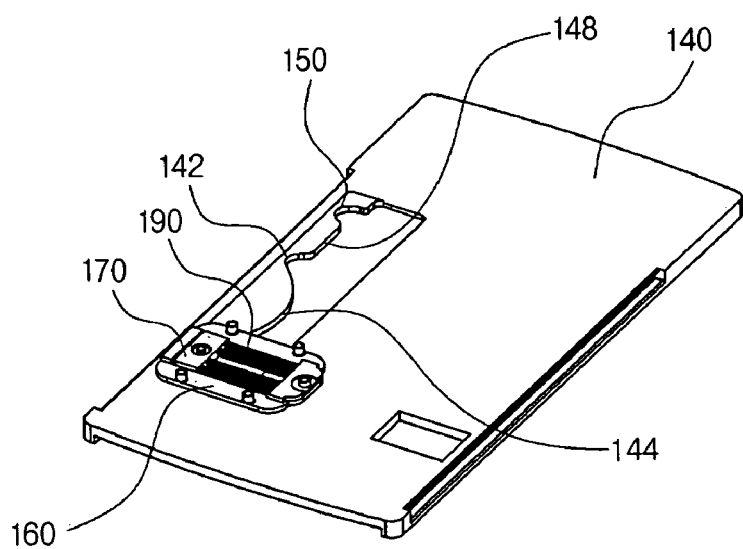
Figure 19:
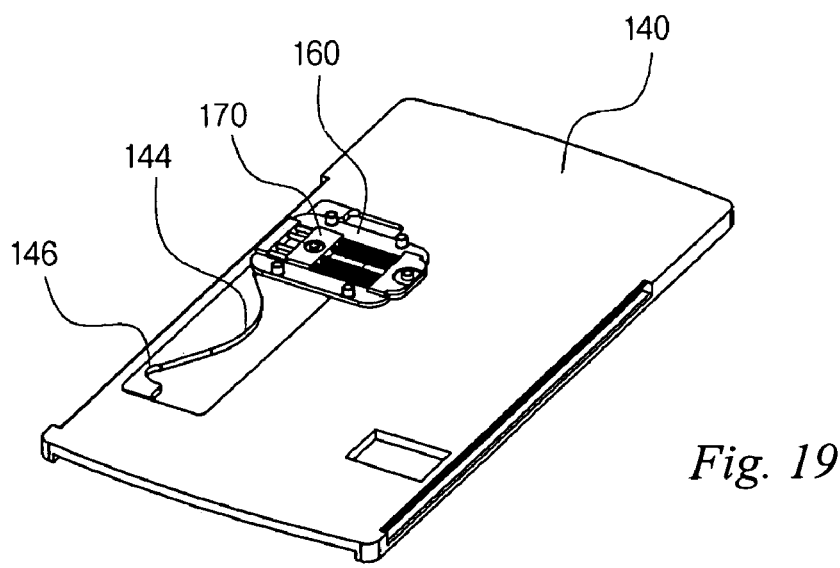

As shown in FIG. 18, if the roller 180 reaches the second depression 146, it remains there by means of the resiliency of the compression spring 190.

On the other hand, if the sub-body 130 is moved downwards, the roller 180 runs through the stop-free region 148. At the stop-free region 148, the compression spring 190 does not affect the movement of the second plate 140. Thus, a user can stop moving the sub-body 130 during the downward movement.

Figure 20:
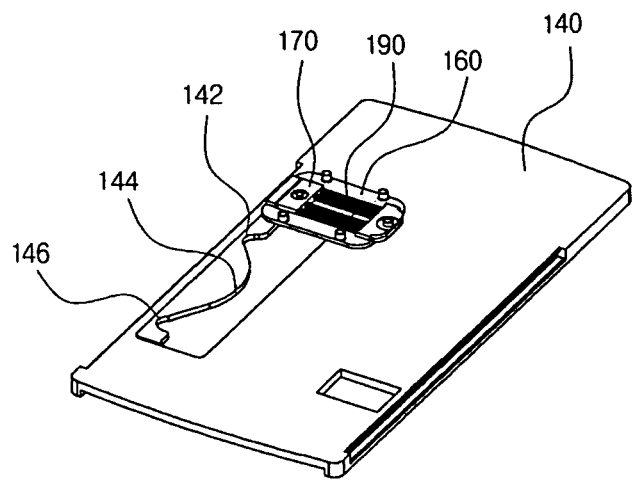
Figure 21:
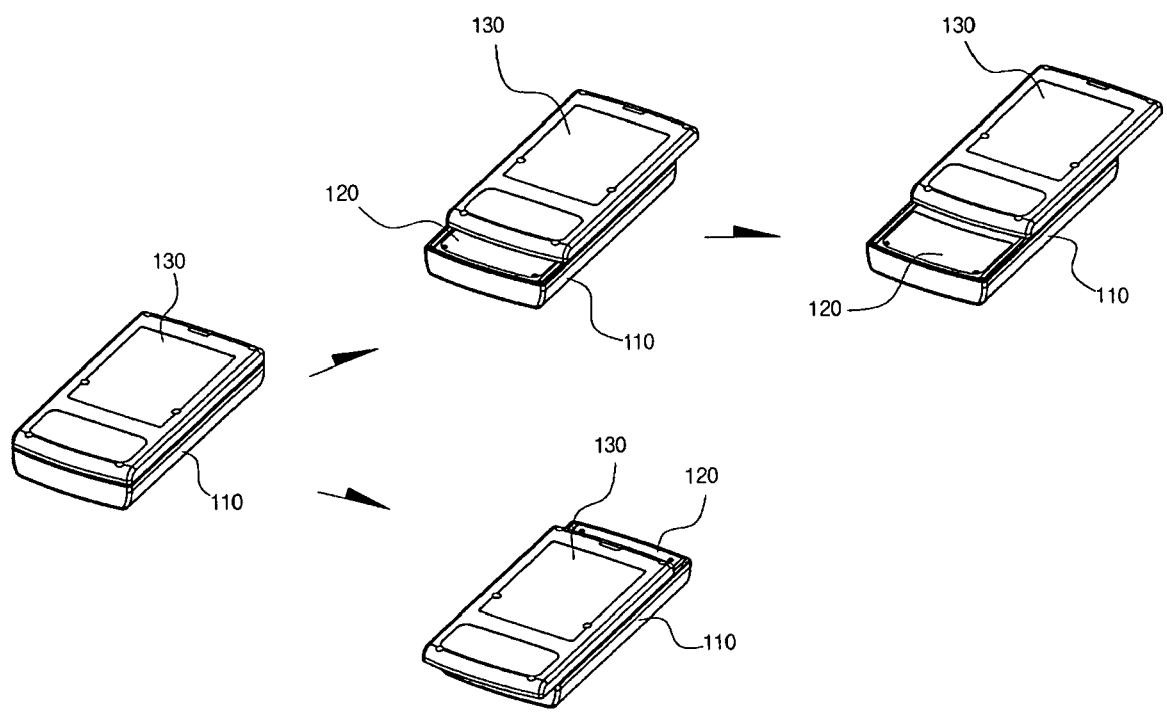
FIG. 21 is a perspective view showing operations of the portable terminal of FIG. 11.

After passing through the stop-free region 148, the roller 180 is latched on the third depression 150 as shown in FIG. 20. Similarly, the roller 180 remains at the third depression due to the resilient force of the compression spring 190.

Hereafter, a third embodiment of the invention will be explained.

Figure 22:
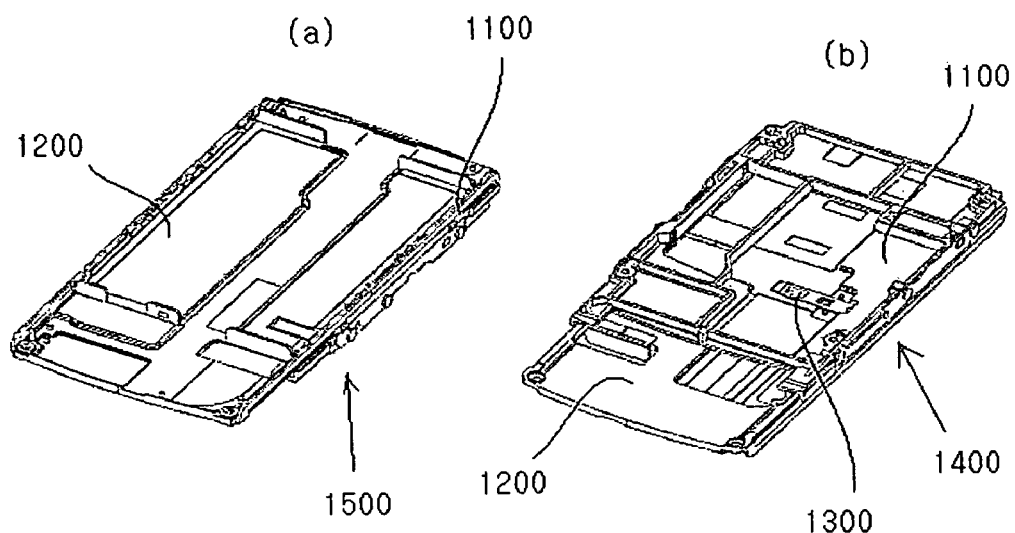
FIG. 22 is a perspective view showing a slider mechanism according to a third embodiment of the invention.
Figure 23:
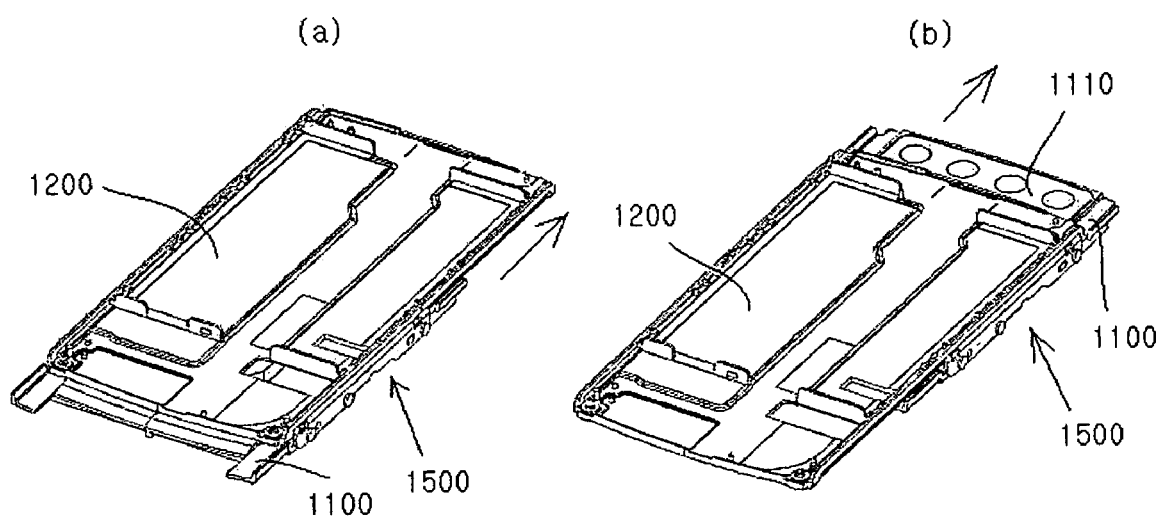
FIG. 23 shows the operation of the slider mechanism in FIG. 22.
Figure 24:
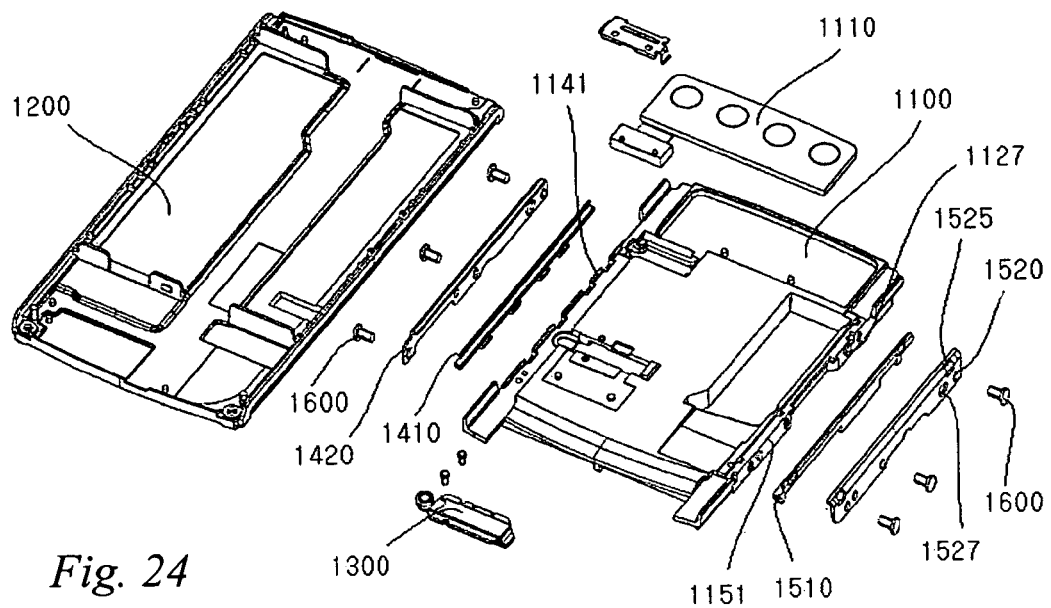
FIGS. 24 and 25 are exploded perspective views of the slider mechanism of FIG. 22.
Figure 25:
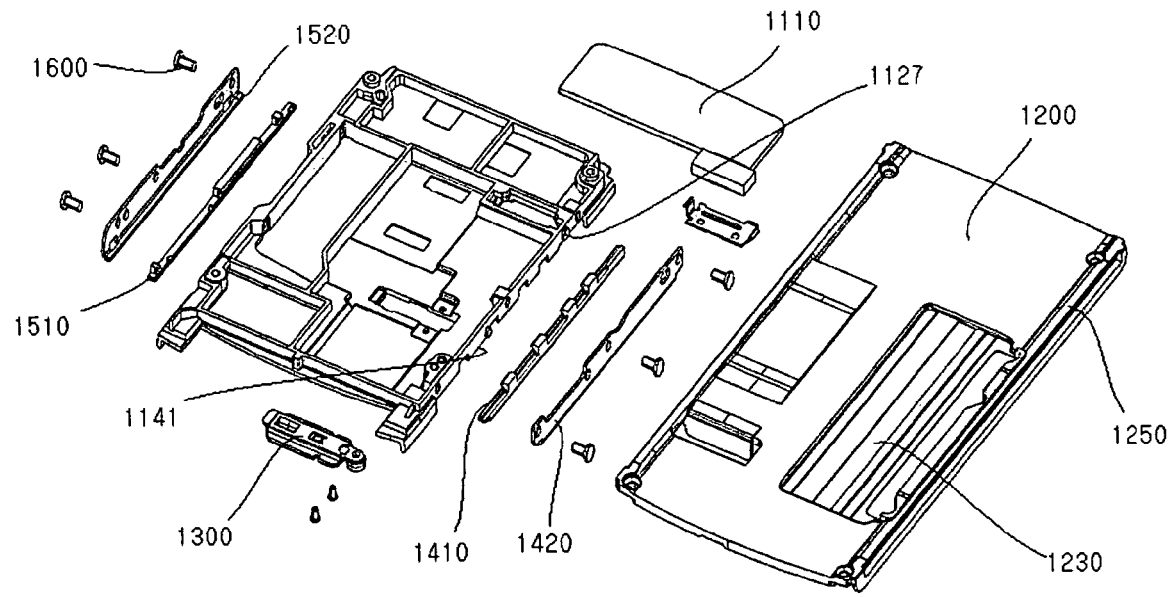

FIG. 22 is a perspective view showing a slider mechanism according to a third embodiment of the invention. FIG. 23 shows the operation of the slider mechanism in FIG. 22. FIGS. 24 and 25 are exploded perspective views of the slider mechanism of FIG. 22.

As illustrated in FIGS. 22 to 25, the slider mechanism of this embodiment includes a first cover 1100, a second cover 1200, a guide member 1400, 1500, and a plunger assembly 1300.

FIG. 22(a) is a front perspective view of the slider mechanism and FIG. 22(b) is a rear perspective view of the slider mechanism. FIG. 23(a) shows the slider mechanism where the second cover 1200 is moved up. FIG. 23(b) shows the slider mechanism where the first cover 1100 is moved up.

The first cover 1100 is to be combined with a third cover (not shown). A printed circuit board of a portable phone is installed on the third cover and a battery is to be mounted on the back of the third cover.

The second cover 1200 is to be combined with a fourth cover (not shown). A display unit of the portable phone is mounted on the fourth cover.

As shown in FIG. 23(b), a music keypad, a small camera or the like may be installed in the upper region of the first cover 1100 and a keypad or the like may be installed in the lower region of the first cover 1100.

The second cover 1200 is slidably combined with the first cover 1100. For this purpose, the guide members 1400 and 1500 are mounted on lateral sides of the second cover 1200 and the first cover 1100 such that the second cover 1200 slidably moves on the first cover 1100 along the longitudinal direction thereof.

Referring to FIGS. 24 and 25, the guide members 1400 and 1500 includes sliding tracks 1420 and 1520 and sliding surfaces 1410 and 1510, which will be hereinafter explained in detail.

The plunger assembly 1300 is mounted between the first cover 1100 and the second cover 1200 such that the second cover 1200 can stop at a desired position while the second cover 1200 slidably moves with respect to the first cover 1100.

Figure 26:
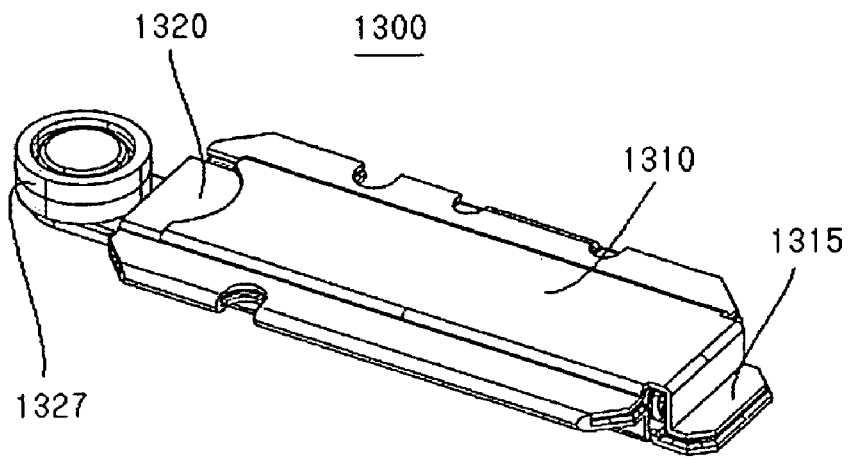
FIG. 26 is a perspective view of a plunger assembly according to the third embodiment.
Figure 27:
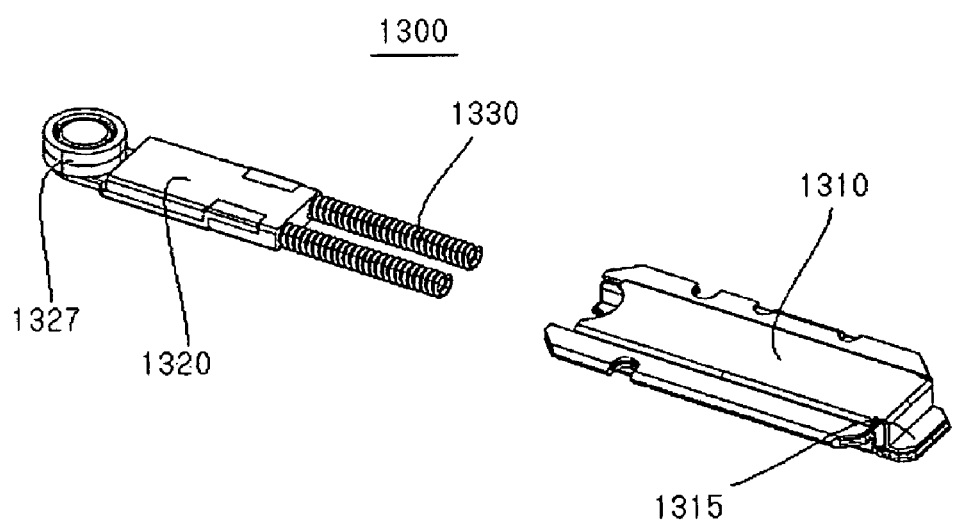
FIG. 27 is an exploded perspective view of the plunger assembly of FIG. 26.
Figure 28:
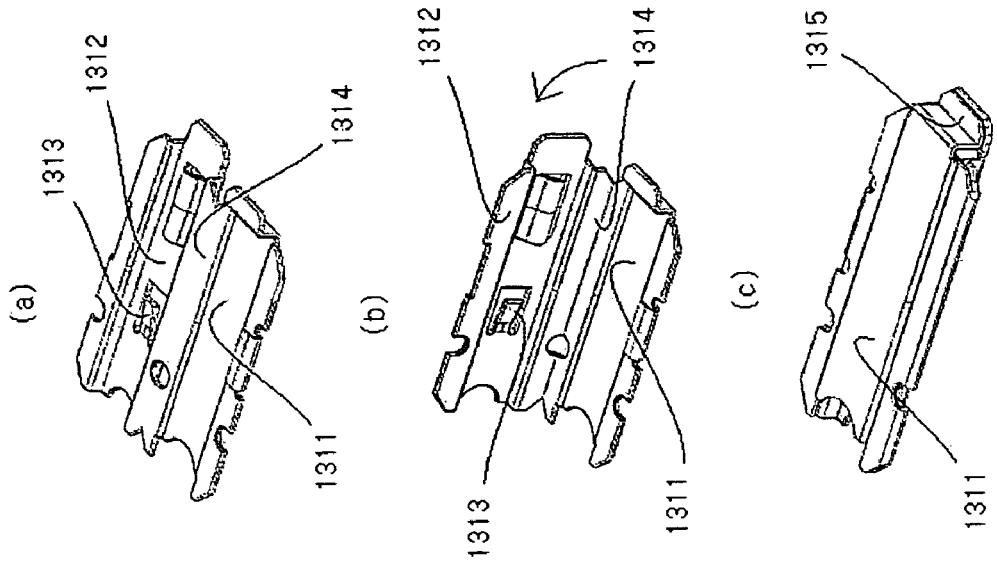
FIG. 28 is a perspective view of a housing in the plunger assembly of FIG. 26.
Figure 29:
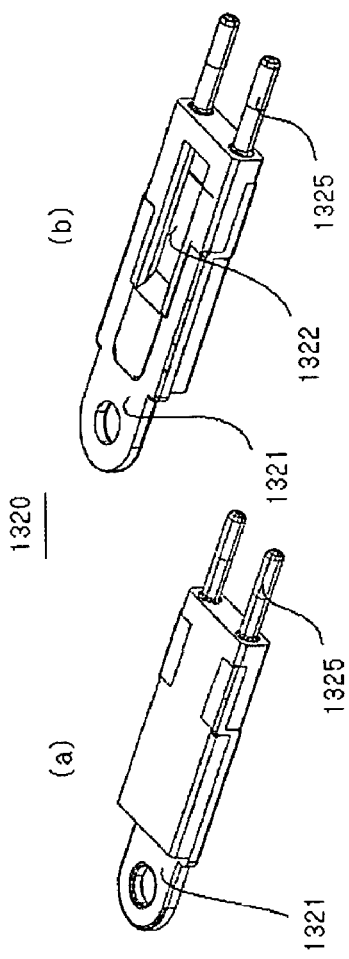
FIG. 29 is a perspective view of a plunger in the plunger assembly of FIG. 26.
Figure 30:
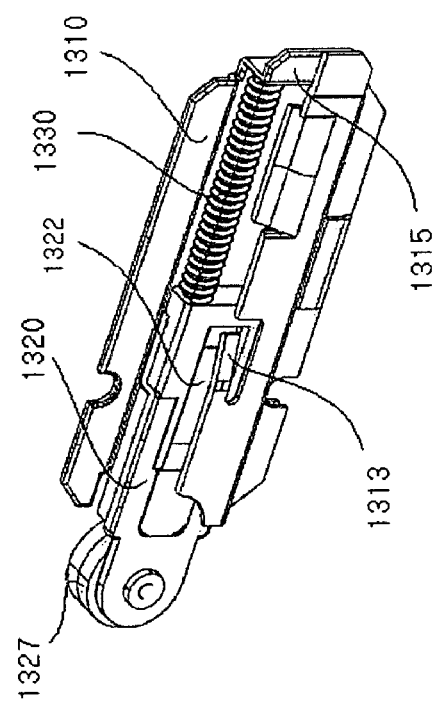
FIG. 30 is a partial exploded view of the plunger assembly of FIG. 26.

FIG. 26 is a perspective view of a plunger assembly 1300 according to the third embodiment. FIG. 27 is an exploded perspective view of the plunger assembly 1300 of FIG. 26. FIG. 28 is a perspective view of a housing in the plunger assembly 1300 of FIG. 26. FIG. 29 is a perspective view of a plunger 1320 in the plunger assembly 1300 of FIG. 26. FIG. 30 is a partial exploded view of the plunger assembly 1300 of FIG. 26.

As shown in FIGS. 26 to 30, the plunger assembly 1300 includes a housing member 1310, a plunger 1320 and a compressive spring 1330.

Referring to FIG. 27, the housing member 1310 is opened towards its one end, through which the plunger 1320 and the compressive spring 1330 are inserted.

Referring to FIG. 28, the housing member 1310 is comprised of a first housing 1311 and a second housing 1312, which are combined with each other. The second housing 1312 is provided with a concave space formed to receive the plunger 1320 in-between with the first housing 1311.

Here, the first housing 1311 and the second housing 1312 may be separately fabricated and combined. As shown in FIG. 28(a), preferably, the first housing 1311 and the second housing 1312 may be integrally fabricated so as to be connected with each other through their lateral sides 1314.

As shown in FIGS. 28(a), (b) and (c), in case where the first housing 1311 and the second housing 1312 are integrally fabricated, the shared lateral side 1314 of the first and second housings 1311 and 1312 can be bent to thereby combine the first and second housing with each other.

At this time, the other opposite lateral sides to the lateral side 1314 are connected to each other through a bending process.

In this way, the first and second housings 1311 and 1312 are integrally fabricated and combined with each other through a bending process, thereby enabling to improve assembling characteristics of the housing member 1310, as compared with the separate fabrication.

In addition, as shown in FIG. 28, a stopper 1313 is protruded on the bottom of the housing member 1310. The stopper 1313 functions to restrict movement of the plunger 1320, which will be hereinafter explained in detail.

Referring to FIGS. 27 and 29, the plunger 1320 is slidably inserted into one end of the housing member 1310. A roller 1327 is rotatably attached to one end of the plunger 1320 and an insert-shaft 1325 is formed at the other end of the plunger 1320 along its longitudinal direction.

A compressive spring 1330 is inserted onto the insert-shaft 1325 to resiliently support the plunger 1320.

Here, as shown in FIG. 29, the skeleton structure 1321 of the plunger 1320 is made of a metallic material, and, through a POM injection molding process, a latching groove 1322 is formed in the bottom face so as to be longitudinally extended and the insert-shaft 1325 is formed at the other end thereof.

Referring to FIG. 30, the stopper 1313 is inserted into the latching groove 1322. The stopper 1313 is restricted within both ends of the latching groove 1322 and thus the plunger 1320 can be moved within a limited distance.

Further, the stopper 1313 is protruded towards the other end of the housing member 1310, i.e., upwardly towards the un-opened direction and has an up-and-down resilience.

Therefore, when the plunger 1320 is being inserted into the housing member 1310, it can be forcibly pushed towards the other end of the housing member 1310. Thus, the stopper 1313 is pushed downwardly by the plunger 1320. When the latching groove 1322 reaches the stopper 1313, the stopper 1313 is restored to its original position due to its resiliency, so that the stopper is inserted into the latching groove 1322.

Furthermore, the latching groove 1322 may have a slant plane corresponding to the stopper 1313. The slant plane is formed to the roller 1327 side. Thus, the size of the latching groove 1322 can be maximized within a limited space.

The above plunger assembly 1300 is fabricated by simply inserting the compressive spring 1330 and the plunger 1320 into the pre-fabricated housing member 1310, thereby enabling to simplify the assembling process.

Figure 31:
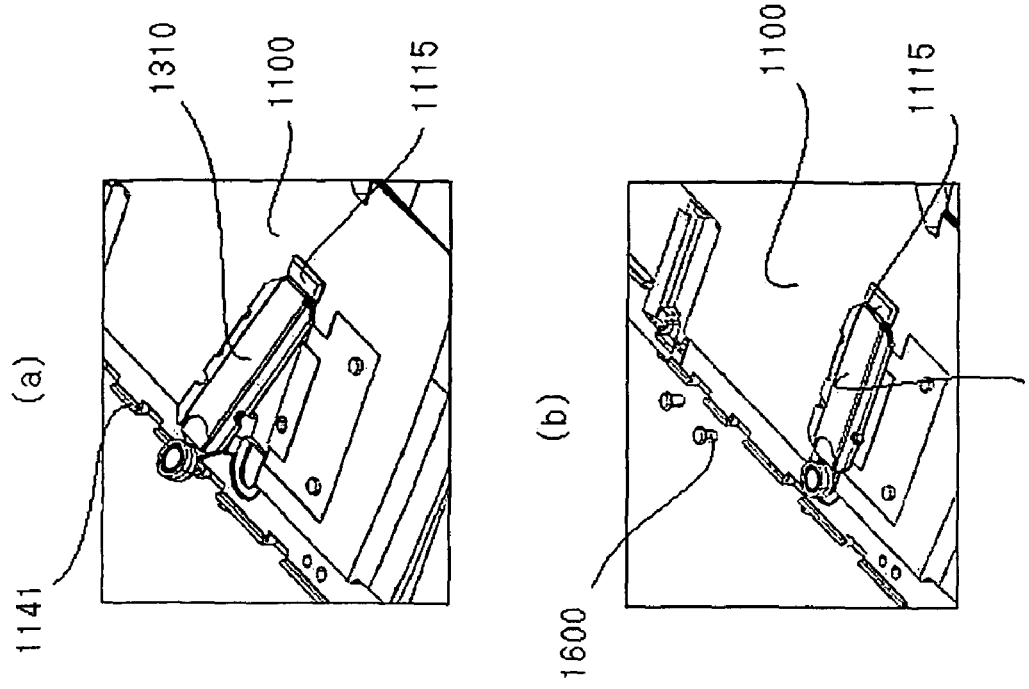
FIG. 31 is a perspective view showing assembling of the plunger assembly to the second cover.

As shown in FIG. 31, the plunger assembly 1300 is combined with the first cover 1100. For this purpose, the housing member 1310 is provided at its other end with an insert-protrusion 1315 as shown in FIG. 26, and as shown in FIG. 31, the first cover 1100 is provided with an insert-hole 1115.

In order to mount the plunger assembly 1300, as shown in FIG. 31(a), the insert-protrusion 1315 is inserted into the insert-hole 1115 and the other end of the plunger assembly 1300 may be snapped into the first cover 1100. Further, as shown in FIG. 31(b), a connection means 1600 such as rivets or screws can be used to fixedly combine the plunger assembly 1300 to the first cover 1100.

In this way, the plunger assembly 1300 is snap-combined with the first cover 1100 and then fixed thereto using the connection means 1600 such as rivets or screws. Thus, the plunger assembly 1300 can be disposed at a desired position of the first cover 1100, thereby enabling to improve assembling and productivity.

Figure 32:
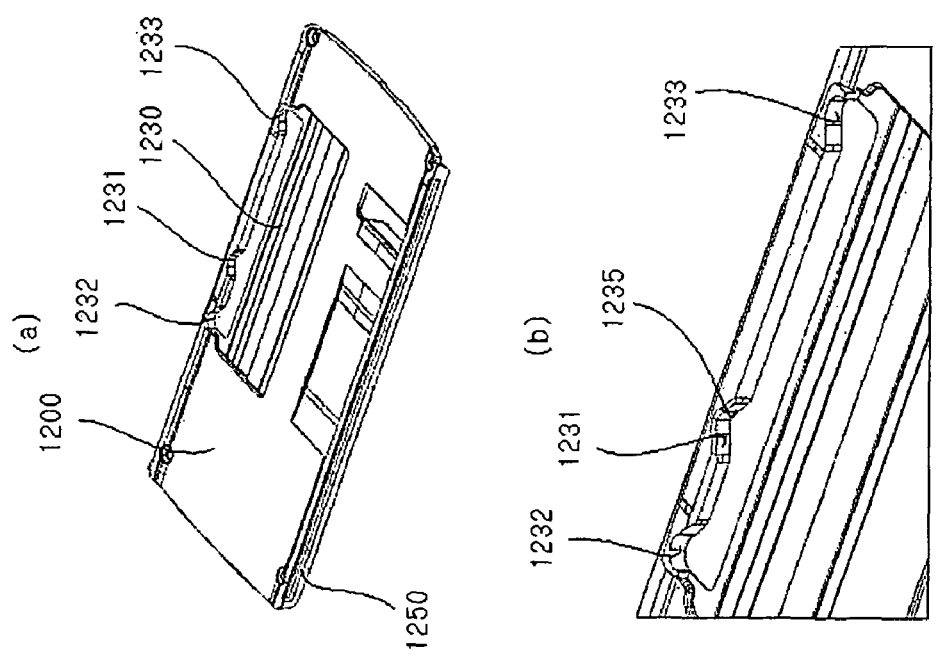
FIG. 32 is a perspective view showing the third cover of FIG. 22.

On the other hand, as shown in FIG. 32, the second cover 1200 is provided with a guide groove 1230 formed in longitudinal direction so as to be able to guide the plunger assembly 1300 mounted on the first cover 1100. The second cover 1200 is provided at its lateral side with a sliding groove 1250, into which a sliding track 1410, 1510 of a guide member 1400, 1500 is inserted. Details on the guide member 1400, 1500 will be hereinafter described.

FIG. 32(a) is a perspective view of the second cover 1200 and FIG. 32(b) is an enlarged view of the guide groove 1230 in FIG. 32(a).

The guide groove 1230 is provided with at least one stopper depression 1231, 1232, 1233 formed such that the roller 1327 of the plunger 1320 is latched with the stopper depression to be stopped at a desired position.

That is, at the state where the plunger 1320 rests on a first stopper depression 1231 at the center in FIG. 32, if the second cover 1200 is moved, the plunger 1320 is released from the first stopper depression 1231 and retracted to compress the compressive spring 1330. While the third cover 1200 continues to move, the plunger 1320 can move to a second stopper depression 1232 or a third stopper depression 1233 through rotation of the roller 1327.

When the plunger 1320 reaches the second stopper depression 1232 or the third stopper depression 1233, the roller 1327 is latched to the second stopper depression 1232 or the third stopper depression 1233 due to restoration of the compressed spring 1330. Thus, the second cover 1200 can not arbitrarily move away from the second or third stopper depression without any external force.

Here, as shown in FIG. 32(b), an insert slope 1235 is formed in the free end of the first stopper depression 1231. When the plunger assembly 1300 is assembled into the second cover 1200, it can be easily inserted along the insert slope 1235 of the first stopper depression 1231.

That is, when the plunger assembly 1300 is assembled into the guide groove 1230, the side face of the roller 1327 can easily slide down along the insert slope 1235 and be inserted into the first stopper depression 1231.

On the other hand, referring to FIGS. 22 and 23, the guide member 1400, 1500 is attached to lateral sides of the first cover 1100 and the second cover 1200 such that the second cover 1200 can slidably move upwards and downwards on the first cover 1100, or vice versa.

As shown in FIGS. 24 and 25, the guide member 1400, 1500 includes a sliding track 1420, 1520 and a sliding spacer 1410, 1510. The sliding track 1420, 1520 includes a first sliding track 1420 and a second sliding track 1520 and the sliding spacer 1410, 1510 includes a first sliding spacer 1410 and a second sliding spacer 1510.

Figure 33:
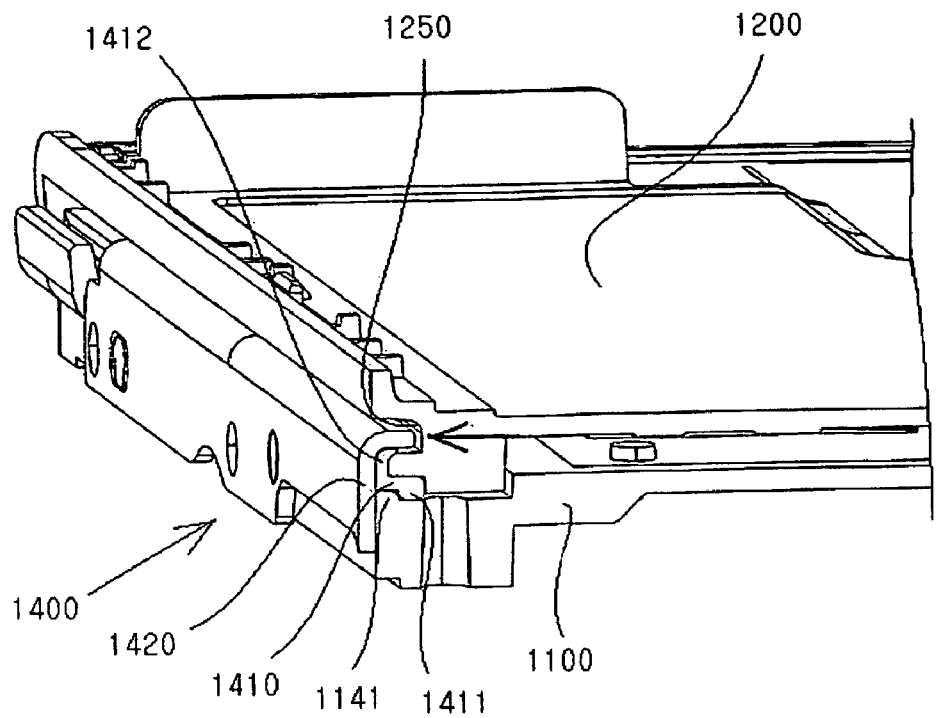
FIG. 33 shows a lateral side of the slider mechanism of FIG. 22.

FIG. 33 shows part of the slider mechanism according to the third embodiment.

As shown in FIG. 33, the first guide member 1400 is mounted on one lateral side of the first cover 1100 and the second cover 1200, i.e., on the lateral side to which the plunger assembly 1300 pushes the second cover 1200. The first guide member 1400 is comprised of a first sliding track 1420 and the first sliding spacer 1410.

Figure 34:
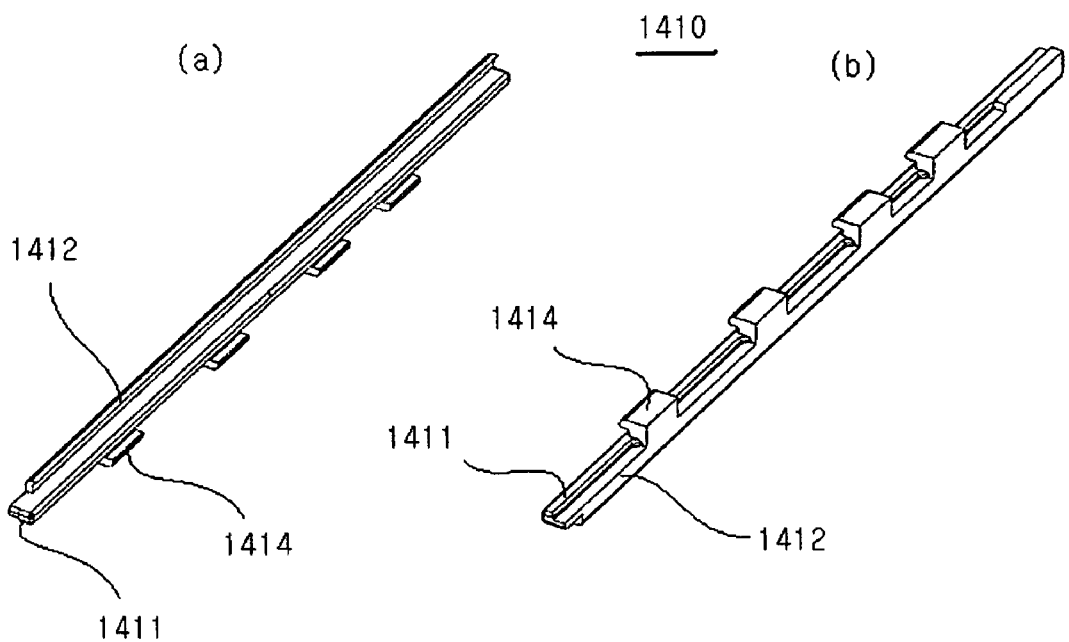
FIG. 34 is a perspective view showing a first sliding spacer of FIG. 22.
Figure 35:
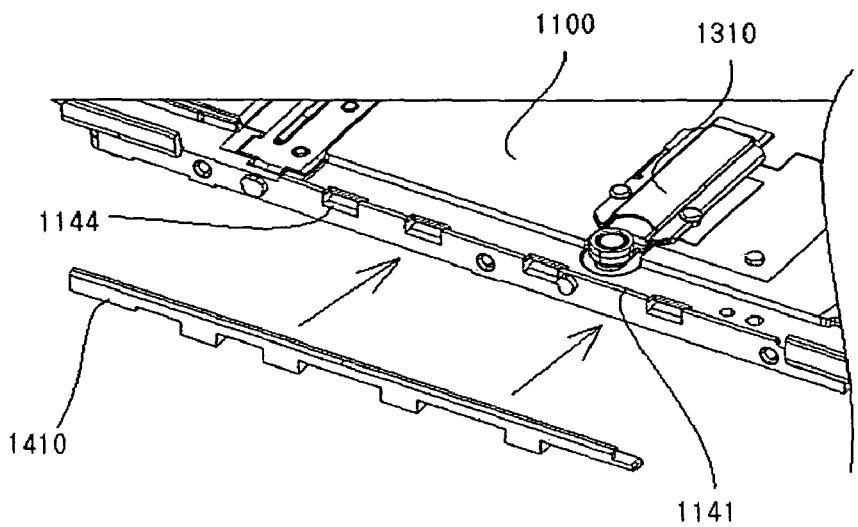
FIG. 35 shows assembling of the first sliding spacer to the second cover of FIG. 22.
Figure 36:
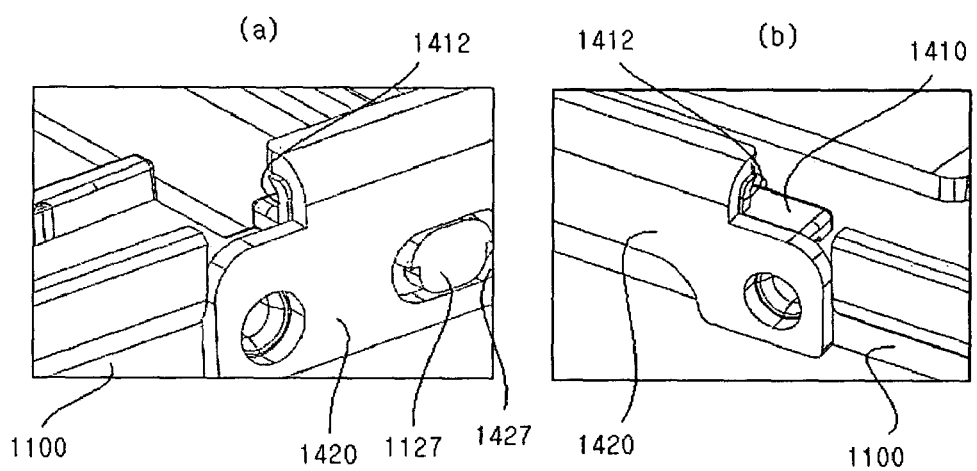
FIG. 36 is a perspective view showing a combined structure of the first sliding spacer and the first sliding track into the second cover of FIG. 22.

FIG. 34 is a perspective view of the first sliding spacer 1410 of the third embodiment. FIG. 35 is a perspective view showing a combined structure of the first sliding spacer 1410 to the first cover 1100. FIG. 36 is a perspective view showing a combined structure of the first sliding spacer 1410 and the first sliding track 1420 to the first cover 1100 in the third embodiment.

As shown in FIG. 33, the first sliding spacer 1410 is disposed between the first cover 1100 and the second cover 1200 such that the lateral sides of the first cover 1100 and the second cover 1200 are directly contacted to each other.

At this time, preferably, the first sliding spacer 1410 is formed of synthetic resin through a POM injection molding process.

As described above, since the first sliding spacer 1410 is fabricated using a synthetic resin, noises such as metallic-friction noise can be prevented, which may be caused when the first and second covers 1100 and 1200 made of a metallic material slide against each other. In addition, smooth sliding between the first and second covers can be achieved.

Referring to FIG. 34, the first sliding spacer 1410 is formed in an elongated form. A first latching protrusion 1411 and a first fixing protrusion 1414 are formed in the lower side of the sliding spacer 1410 and a first sliding contact 1412 is formed in the upper side thereof.

Referring to FIGS. 33 and 35, the first cover 1100 is provided at its lateral side with a first release-inhibition latch 1141 formed such that the first latching protrusion 1411 is latched thereto to prevent the first sliding spacer 1410 from escaping. In addition, the first cover 1100 is provided with a first fixing groove 1144, into which the first fixing protrusion 1414 is inserted such that the first cover 1100 and the first sliding spacer 1410 can be integrally moved.

As shown in FIG. 33, the first sliding spacer 1410 contacts the first sliding contact 1412 while wrapping around the lateral side of the second cover 1200.

Here, the upper portion of the first sliding contact 1412 is bent inwards so as to be inserted into a sliding groove 1250 formed at both lateral sides of the second cover 1200.

The outer face of the first sliding spacer 1410 is wrapped around by and supported on the first sliding track 1420.

That is, the first sliding spacer 1410 is disposed between the first sliding track 1420, the second cover 1200 and the first cover 1100, thereby preventing noises that is caused by the first and second covers when they are sliding against each other.

The lower portion of the first sliding track 1420 is mounted on the lateral side of the first cover 1100 and the upper portion thereof is bent inwards and inserted into the sliding groove 1250. Thus, the second cover 1200 and the first cover 1100 can slide upwards and downwards with respect to each other, without being released from each other.

At this time, in order that the second cover 1200 and the first cover 1100 can slide against each other, the length of the first sliding spacer 1410 and the first sliding track 1420 is to be shorter than that of the sliding groove 1250.

As described above, the upper portion of the sliding contact 1412 is inserted into the sliding groove 1250 of the second cover 1200, thereby avoiding and reducing noise which is caused when the upper portion of the sliding track 1420 contacts directly the bottom floor of the sliding groove 1250 of the second cover 1200.

In addition, referring to FIGS. 24, 25 and 36, the first cover 1100 is provided with an insert-positioning protrusion 1127 protruded at the lateral side thereof. The first sliding track 1420 is provided with a first insert hole 1427 formed such that the insert-positioning protrusion 1127 can be inserted into the first insert hole 1427. Thus, the first sliding track 1420 can be easily pre-assembled to the first cover 1100 and then fixedly combined thereto using a connection means 1600, thereby improving assembling characteristics.

Therefore, the first fixing protrusion 1414 is inserted into the first fixing groove 1144 to thereby combine the first sliding spacer 1410 with the first cover 1100. The first sliding track 1420 is combined to the first cover 1100 by inserting the insert-positioning protrusion 1127 into the first insert hole 1427 and then using the connection means 1600. Thus, the first sliding spacer 1410, the first sliding track 1420 and the first cover 1100 can be moved together.

Furthermore, referring to FIG. 36, preferably the length of the first sliding contact 1412 of the first sliding spacer 1410 is made longer, for example, about 0.1 mm longer, than that of the bent portion, i.e., the upper portion of the first sliding track 1420.

In this way, when the both upper ends of the first sliding track 1420 contact the end of the sliding groove 1250 during sliding of the first cover 1100 or the second cover 1200, first the both ends of the first sliding contact 1412 made of synthetic resin come to contact the end of the sliding groove 1250 to thereby avoid metallic noises, which may be caused by contact of the first sliding track 1420 and the sliding groove 1250.

Figure 37:
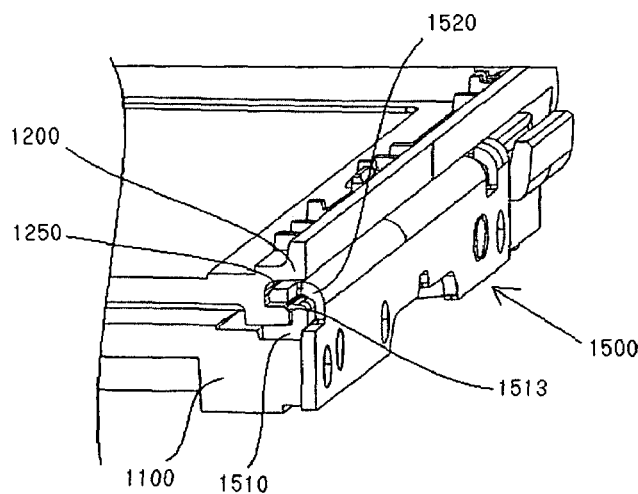
FIG. 37 shows the other lateral side of the slider mechanism of FIG. 22.

FIG. 37 is a partially enlarged view of the slider mechanism according to the third embodiment.

As shown in FIG. 37, the second guide member 1500 is composed of a second sliding track 1520 and a second sliding spacer 1510. The second guide member 1500 is installed at the other lateral sides of the first cover 1100 and the second cover 1200, i.e., at the opposite side to where the second cover 1200 is pushed by the plunger assembly 1300.

Figure 38:
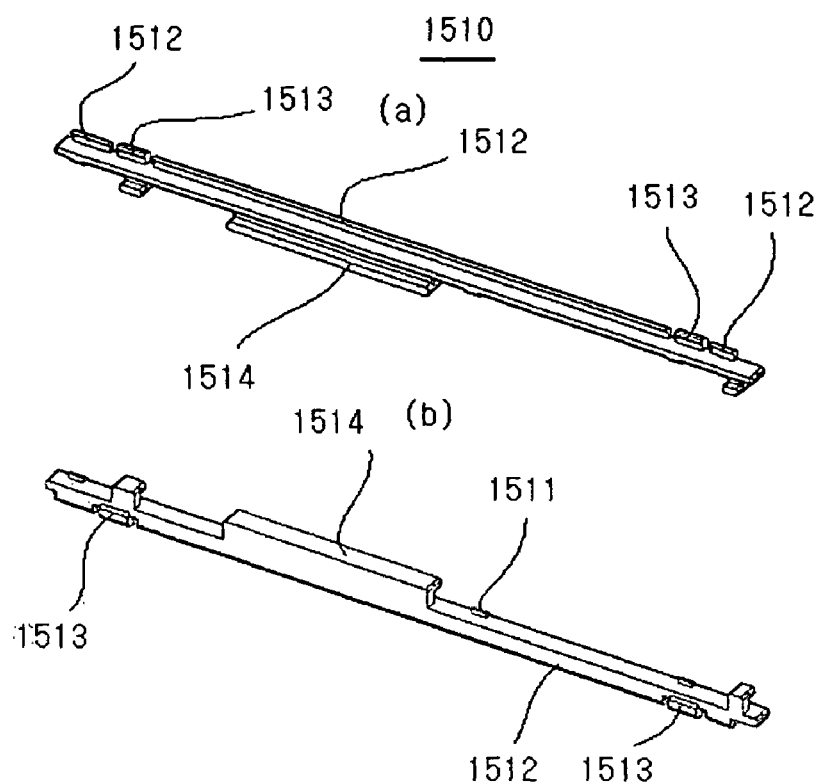
FIG. 38 is a perspective view showing the second sliding spacer of FIG. 22.
Figure 39:
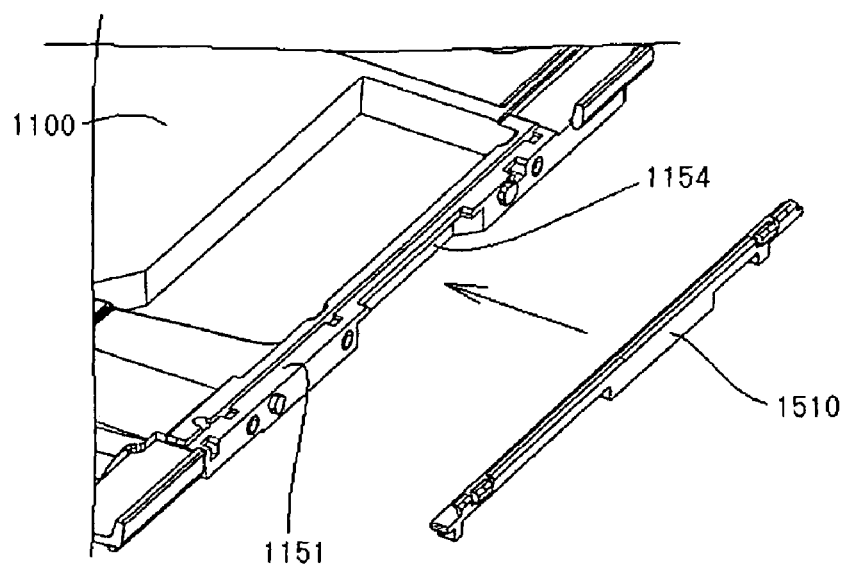
FIG. 39 is a perspective view showing a combined structure of the second sliding spacer with the second cover of FIG. 22.
Figure 40:
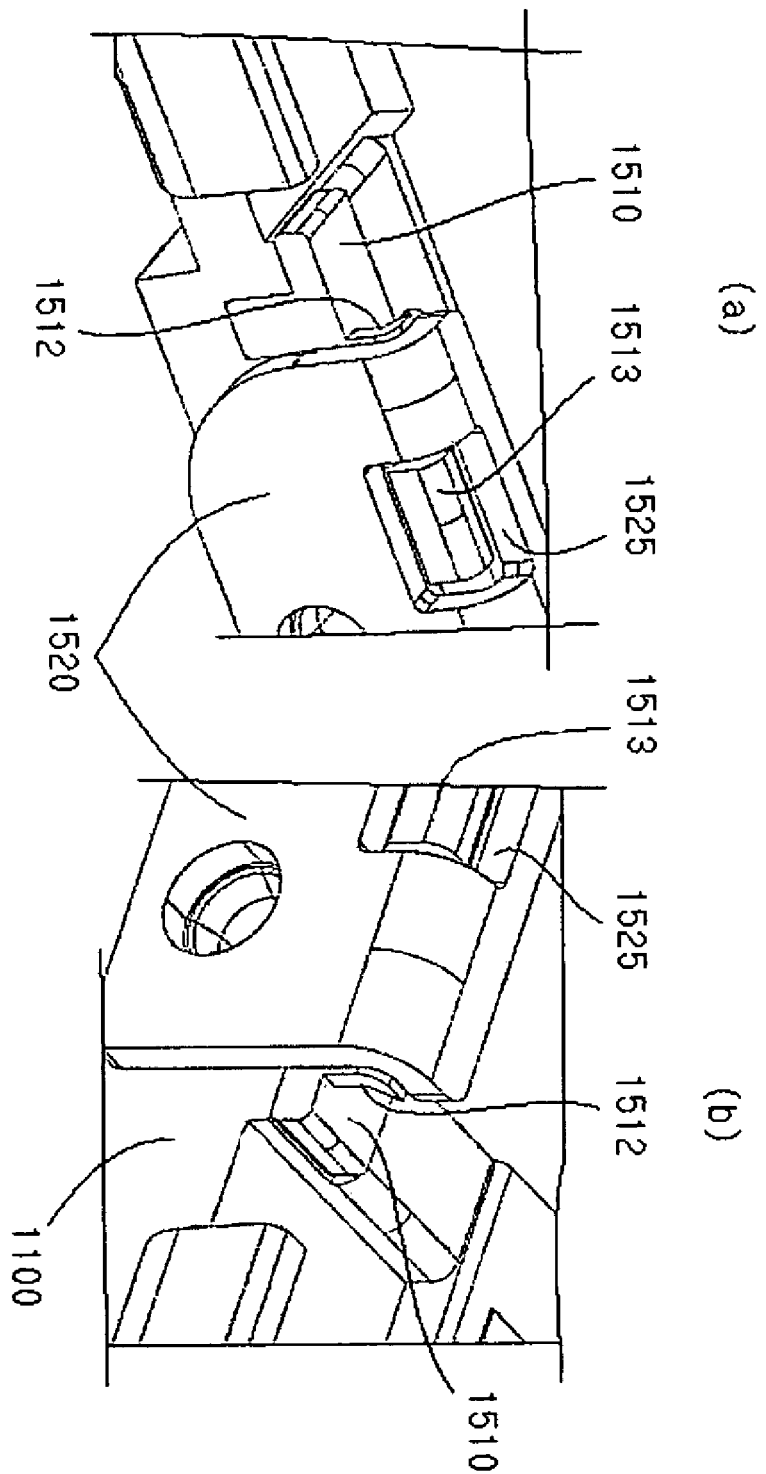
FIG. 40 is a perspective view showing a combined structure of the second sliding spacer and the second sliding track into the second cover of FIG. 22.

FIG. 38 is a perspective view showing the second sliding spacer 1510 of the third embodiment. FIG. 39 shows assembling of the second sliding spacer 1510 to the first cover 1100 in the third embodiment. FIG. 40 is perspective views showing a combined structure of the second sliding spacer 1510 and the second sliding track 1520 to the first cover 1100 in the third embodiment.

Referring to FIG. 37, similar to the first sliding spacer 1410, the second sliding spacer 1510 is disposed between the first cover 1100 and the second cover 1200, so that the lateral sides of the first cover 1100 and the second cover 1200 are directly contacted with each other.

Here, preferably, the second sliding spacer 1510 is formed of a synthetic resin using a POM injection molding process.

As described above, similar to the first sliding spacer 1410, since the second sliding spacer 1510 is fabricated using a synthetic resin, noises such as metallic-friction noise can be prevented, which may be caused when the first and second covers 1100 and 1200 slide against each other. In addition, smooth sliding between the first and second covers can be achieved.

Referring to FIG. 38, the second sliding spacer 1510 is formed in an elongated form. A second latching protrusion 1511 and a second fixing protrusion 1514 are formed in the lower side of the sliding spacer 1510 and a second sliding contact 1512 and an elastic protrusion 1513 are formed in the upper side thereof.

Referring to FIGS. 37 and 39, the first cover 1100 is provided at its other lateral side with a second release-inhibition latch 1151 formed such that the second latching protrusion 1511 of the second sliding spacer 1510 is latched thereto to prevent the second sliding spacer 1510 from escaping from the lateral side. In addition, the first cover 1100 is provided with a second fixing groove 1154, into which the second fixing protrusion 1514 is inserted such that the first second cover 1100 and the second sliding spacer 1510 can be integrally moved.

Similar to the first sliding spacer 1410, the second sliding spacer 1510 contacts the second sliding contact 1512 while wrapping around the other lateral side of the third cover 1200.

Here, the upper portion of the first sliding contact 1512 is bent inwards so as to be inserted into a sliding groove 1250 formed at both lateral sides of the third cover 1200.

In addition, the second sliding spacer 1510 is provided with an elastic protrusion 1513 between multiple second sliding contacts 1512. The elastic protrusion 1513 is spaced apart from the other lateral side of the third cover 1200, but the upper portion of the elastic protrusion 1513 contacts the other lateral side of the third cover 1200.

In this way, since only the upper portion of the elastic protrusion 1513 contacts the other lateral side of the second cover 1200, even if there are some variations in the width of the second cover 1200, the second cover 1200 is pushed back towards the first sliding spacer 1410 to contact therewith. Thus, the third cover 1200 rests in a stable manner, without wobbling to the left or right.

As shown in FIG. 37, the outer face of the second sliding spacer 1510 is wrapped around by and supported on the second sliding track 1520.

That is, the second sliding spacer 1510 is disposed between the second sliding track 1520, the second cover 1200 and the first cover 1100, thereby preventing noises that is caused by the first and second covers when they are sliding against each other.

The lower portion of the first sliding track 1520 is mounted on the lateral side of the first cover 1100 and the upper portion thereof is bent inwards and inserted into the sliding groove 1250. Thus, the third cover 1200 and the first cover 1100 can slide upwards and downwards with respect to each other, without being released from each other.

At this time, in order that the second cover 1200 and the first cover 1100 can slide against each other, the length of the second sliding spacer 1510 and the second sliding track 1520 is to be shorter than that of the sliding groove 1250.

As described above, the upper portion of the second sliding contact 1512 is inserted into the sliding groove 1250 of the second cover 1200, thereby avoiding and reducing noise which is caused when the upper portion of the second sliding track 1520 contacts directly the bottom floor of the sliding groove 1250 of the third cover 1200.

In addition, referring to FIGS. 24, 25 and 40, the first cover 1100 is provided with an insert-positioning protrusion 1127 protruded at the lateral side thereof. The second sliding track 1520 is provided with a second insert hole 1527 formed such that the insert-positioning protrusion 1127 can be inserted into the second insert hole 1527. Thus, the second sliding track 1520 can be easily pre-assembled to the first cover 1100 and then fixedly combined thereto using a connection means 1600, thereby improving assembling characteristics.

Therefore, the second fixing protrusion 1514 is inserted into the second fixing groove 1154 to thereby combine the second sliding spacer 1510 with the first cover 1100. The second sliding track 1520 is combined to the first cover 1100 by inserting the insert-positioning protrusion 1127 into the second insert hole 1527 and then using the connection means 1600. Thus, the second sliding spacer 1510, the second sliding track 1520 and the first cover 1100 can be moved together.

Furthermore, referring to FIG. 40, preferably the length of the second sliding contact 1512 of the second sliding spacer 1510 is made longer, for example, about 0.1 mm longer, than that of the bent portion, i.e., the upper portion of the second sliding track 1520.

In this way, when the both upper ends of the second sliding track 1520 contact the end of the sliding groove 1250 during sliding of the first cover 1100 or the second cover 1200, first the both ends of the second sliding contact 1512 made of synthetic resin come to contact the end of the sliding groove 1250 to thereby avoid metallic noises, which may be caused by contact of the second sliding track 1520 and the sliding groove 1250.

In addition, the second sliding track 1520 is provided with an escape hole 1525 formed in a position corresponding to the elastic protrusion 1513. Thus, the elastic protrusion 1513 can elastically bend backwards into the escape hole 1252 to thereby provide a further resilience to the elastic protrusion 1513.

Through the above guide members 1400 and 1500, the first cover 1100 and the second cover 1200 can easily slide up and down, without wobbling.

Hereafter, a fourth embodiment of the invention will be explained.

Figure 42:
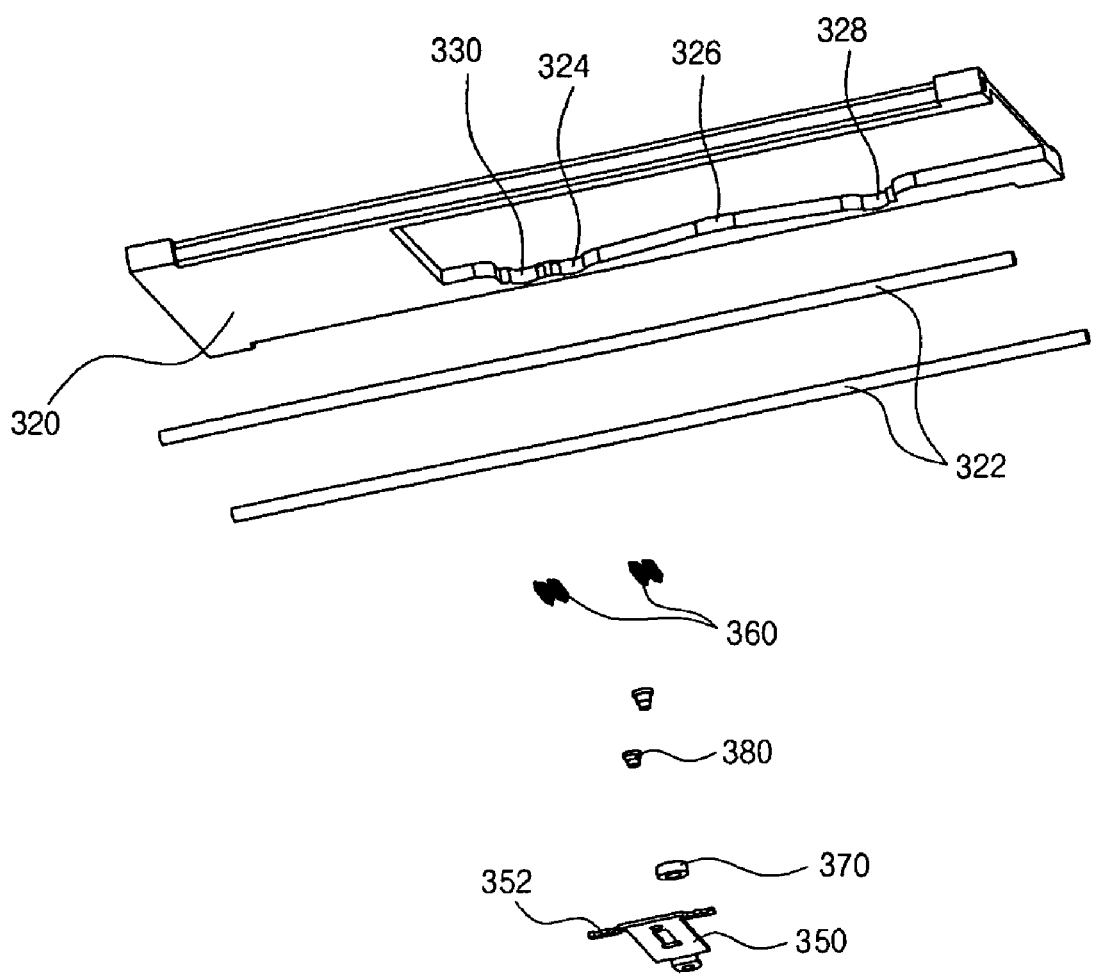
Figure 43:
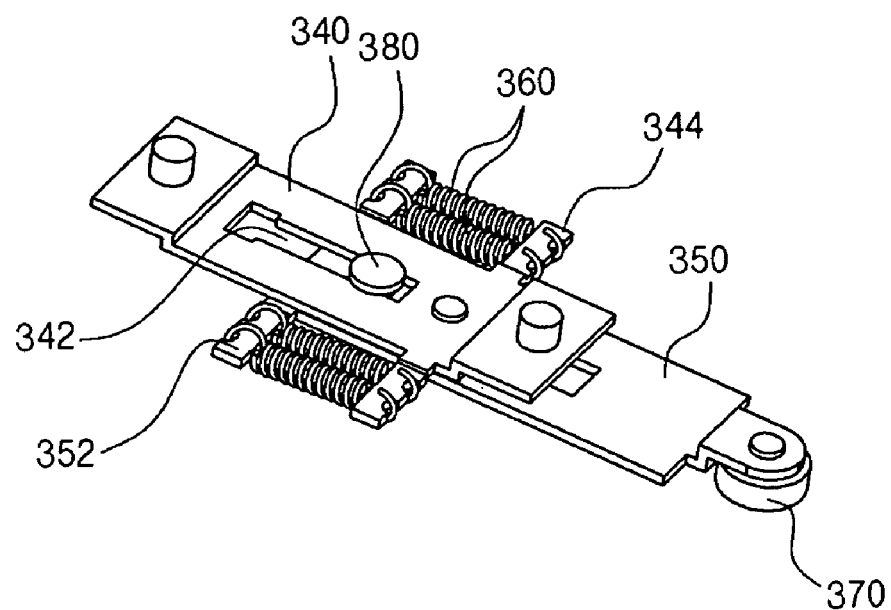
FIGS. 43 and 44 are perspective views showing part of the slider mechanism of FIGS. 41 and 42.
Figure 44:
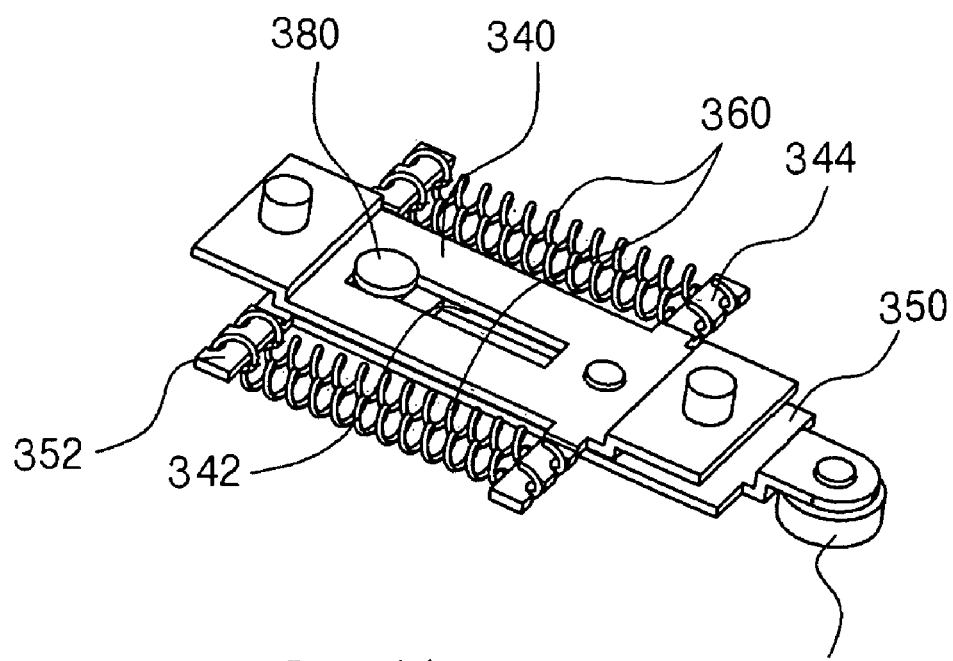

FIGS. 41 and 42 are exploded perspective views of a slider mechanism according to a fourth embodiment of the invention. FIGS. 43 and 44 are perspective views showing part of the slider mechanism of FIGS. 41 and 42.

The slider mechanism combines a sub-body and a main body of a portable terminal with each other so as to slide against each other. The slide mechanism includes a first plate 310 to be fixed to the main body and a second plate 320 to be fixed to the sub-body. The second plate 320 is slidably combined with the first plate 310 in parallel thereto and includes a cam profile formed along the sliding direction. The cam profile is comprised of consecutive depressions and slant planes. A fixing lever 340 is fixed to the first plate 310. A sliding lever 350 is disposed so as to move towards and far away from the cam profile. The sliding lever 350 is face-contacted with the fixing lever 340. At least one tension spring 360 is provided to generate a resilient force for advancing the sliding lever 350 towards the cam profile. One end of the tension spring 360 is connected to one end of the fixing lever 340 and the other end thereof is connected to one end of the sliding lever 350 facing the one end of the fixing lever 340. A roller 370 is rotatably attached to the sliding lever 350 and rotatably contacts the cam profile.

One of the fixing lever 340 and the sliding lever 350 is provided with a guide groove 342 formed in an elongated shape towards the cam profile. A rivet 380 or the like is fixed through the guide groove 342 to the other one of the fixing lever 340 and the sliding lever 350. Thus, the fixing lever 340 and the sliding lever 350 are slidably combined with each other.

The fixing lever 340 is provided with a first rib 344, to which one ends of tension springs are connected. The sliding lever 350 is provided with a second rib 352, to which the other ends of the tension springs are connected. The tension springs are spread out perpendicular to the length of the fixing and sliding levers.

In this embodiment, two tension springs in each side, total four tension springs 360 are installed to enhance the resilient force and reduce the displacement range of the spring. The sliding lever 350 is perpendicular to the cam profile so that moving distance of the sliding lever 350 and the displacement range of the tension spring 360 can be minimized.

In this way, multiple tension springs 360 are used to provide sufficient resilient force and minimize the displacement of the tension spring 360, thereby improving durability of the slider mechanism. Thus, the slide mechanism of this embodiment can be used for extended period of time without degradation in the functions or failure of the mechanism.

The roller 370 is slidably attached to the sliding lever 350 using a rivet 380. The fixing lever 340 is fixed to the first plate 310 using a rivet 380. The roller 370 rolls along the cam profile when the second plate 320 moves, thereby reducing friction.

A guide shaft 322 is fixed to both lateral sides of the second plate 320. The first plate 310 is provided at its both lateral sides with a shaft holder 312, to which the guide shaft 322 is slidably combined.

The cam profile of the second plate 320 includes a first depression formed at the central area thereof, a mountain-like slant plane 326 formed at one side of the first depression 324, a second depression 328 formed at the end of the slant plane 326, and a third depression 330 formed at the other side of the first depression 324.

When the roller 370 rests on the first depression 324, the sub-body is closed on the main body. When the roller 370 rests on the second depression, the sub-body is opened upwardly on the main body. When the roller 370 rests on the third depression 330, the sub-body is opened downwardly on the main body.

Figure 46:
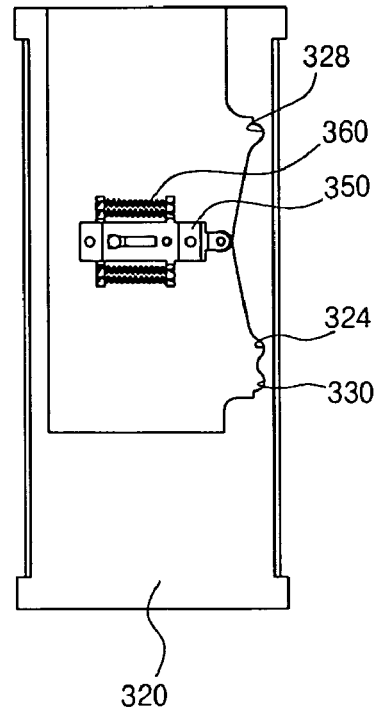

Referring to FIGS. 44 and 46, when the roller 370 runs on the up-slope of the slant plane 326, the tension spring 360 is expanded to resist the movement of the second plate 320. When the roller 370 rolls down the down-slope of the slant plane 326 beyond the transition point of the mountain-like slant plane 326, the tension spring 360 pushes the second plate 320 such that the second plate 320 is automatically moved.

Hereafter, the operation of the slider mechanism of the fourth embodiment will be explained in detail.

FIGS. 45 to 48 are plan views showing the operation of the slider mechanism of FIG. 41.

Figure 45:
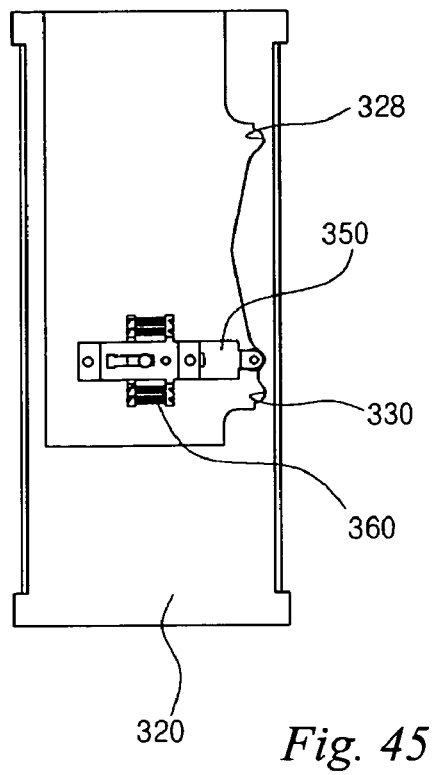
FIGS. 45 to 48 are plan views showing the operation of the slider mechanism of FIG. 41.

Referring to FIG. 45, where the sub-body is closed on the main body, the tension spring 360 pushes the sliding lever 350 and the roller 370 such that the roller 370 remains at the first depression 324.

As shown in FIG. 46, if the sub-body is moved up, the roller 370 is released from the first depression 324 and passes through the slant plane 326. When the roller 370 moves up along the up-slope of the slant plane 326, it is resisted due to the resilience of the tension spring 360. If the roller passes beyond the transition point, the second plate 320 is automatically opened by means of the resilient force of the tension spring 360.

Figure 47:
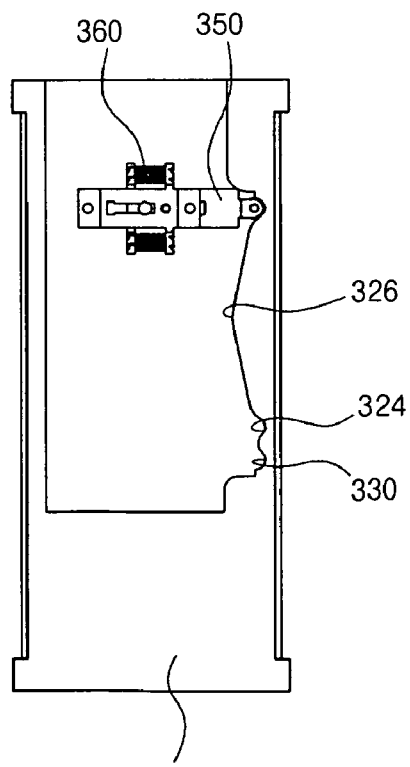
Figure 48:
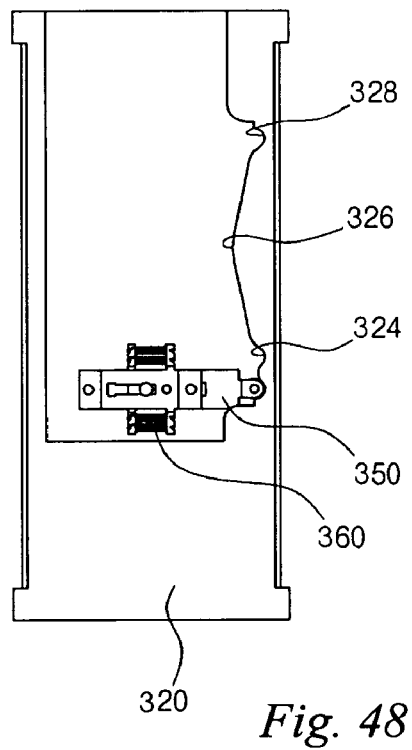

In addition, as shown in FIG. 47, if the roller 370 reaches and rests on the second depression 328, it comes to remain there due to the resilience of the tension spring 360.

On the other hand, if the sub-body is moved down from the initial state of FIG. 45, the roller 370 is released from the first depression 324 and rests on the third depression 330. Similarly, the roller 370 remains at the third depression due to the resilient force of the tension spring 360.

Hereafter, a slider mechanism for portable terminals according to a fifth embodiment of the invention will be explained.

Figure 51:
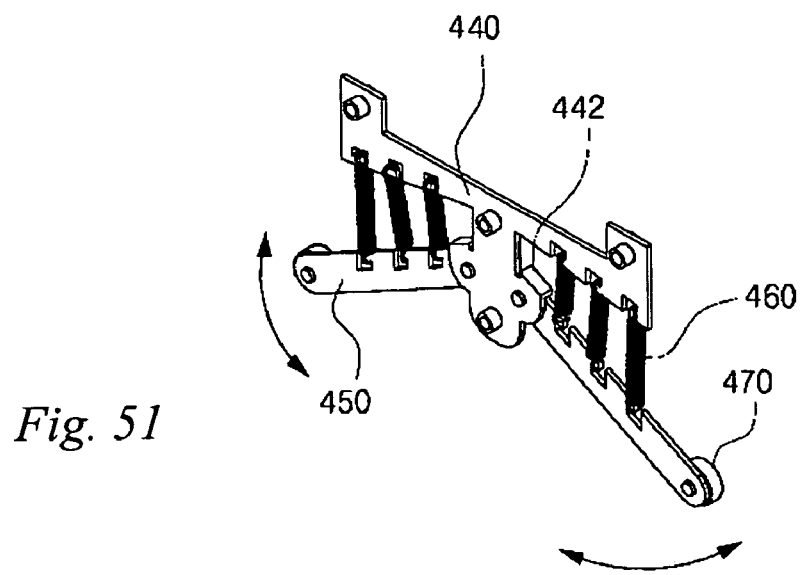
FIGS. 51 and 52 are perspective view showing parts of the slider mechanism of FIG. 49.
Figure 52:
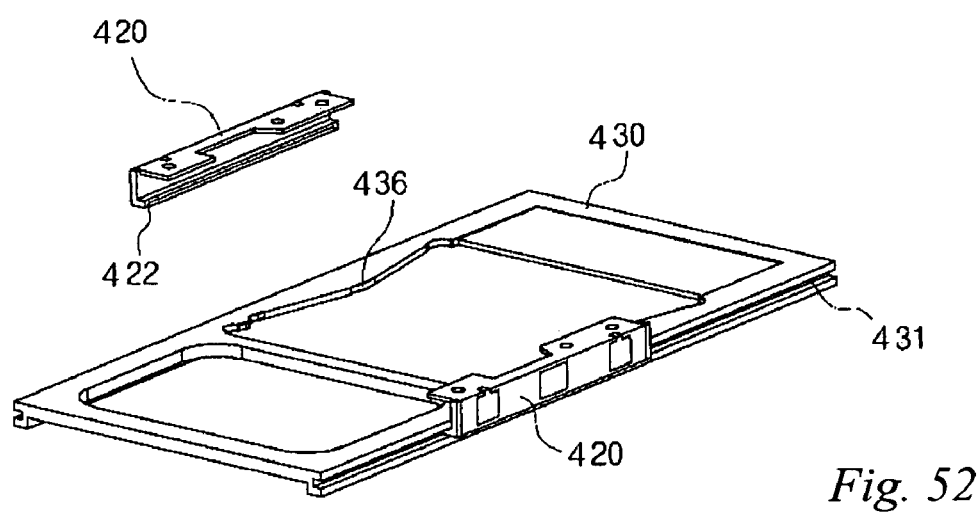
Figure 53:
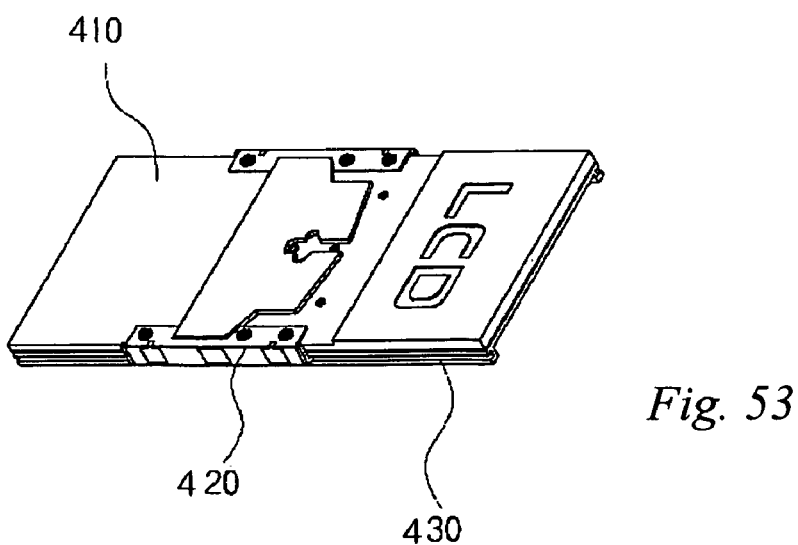
FIG. 53 is a perspective view showing a combined structure of the slider mechanism of FIG. 49.

FIGS. 49 and 50 are exploded perspective views of a slider mechanism according to a fifth embodiment of the invention. FIGS. 51 and 52 are perspective views showing parts of the slider mechanism of FIG. 49. FIG. 53 is a perspective view showing a combined structure of the slider mechanism of FIG. 49.

The slider mechanism combines a sub-body and a main body of a portable terminal with each other so as to slide against each other. The slide mechanism includes a first plate 410 to be fixed to the sub-body and a second plate 420 to be fixed to the main body. The second plate 420 is slidably combined with the first plate 410 in parallel thereto and includes a cam profile formed along the sliding direction. The cam profile is comprised of consecutive depressions and slant planes 436. A fixing frame 440 is fixed to the first plate 410. A pivot lever 450 is provided in such a way that a first end thereof is pivotably combined to the fixing frame 440 through a hinge and a second end thereof moves towards and far away from the cam profile due to pivot movement. Multiple tension springs 460 are provided, one end of which is fixed to the fixing frame 440 and the other end of which is fixed to the pivot lever to generate a tensile force such that the second end of the pivot lever is biased towards the cam profile. A roller is attached to the second end of the pivot lever 450 and contacts and rolls on the cam profile.

The fixing frame 440 is provided with a protruded stopper 442, which restricts rotation of the pivot lever 450 within a certain range of angles.

The cam profile and the pivot lever 450 are formed in symmetrical pairs respectively. Thus, three tension springs are provided at each side. The roller 470 is installed at the second end of each pivot lever 450.

The roller 470 is rotatably combined to the pivot lever 450 using a rivet 480. The roller 470 contacts and rolls on the cam profile when the second plate 430 moves, thereby reducing friction force.

The cam profile of the second plate 420 includes a first depression 432 formed at the central area thereof, a mountain-like slant plane 436 formed at one side of the first depression 432, a second depression 434 formed at the end of the slant plane 436, and a third depression 438 formed at the other side of the first depression 432.

When the roller 470 rests on the first depression 432, the sub-body is closed on the main body. When the roller 470 rests on the second depression 434, the sub-body is opened upwardly on the main body. When the roller 470 rests on the third depression 438, the sub-body is opened downwardly on the main body.

When the roller 470 runs on the up-slope of the slant plane 436, the tension spring 460 is expanded to resist the movement of the second plate 430. When the roller 470 rolls down the down-slope of the slant plane 436 beyond the transition point of the mountain-like slant plane 436, the tension spring 460 pushes the second plate 430 such that the second plate 430 is automatically moved.

A slide groove 431 is formed at both lateral sides of the second plate 430 along moving direction thereof. A guide holder 420 is fixed to both lateral sides of the first plate 410. The guide holder 420 has a guide rib 422 formed to be slidably combined with the slide groove 431.

The guide holder 420 is fixed to the first plate 410 using a screw. The guide holder 420 is formed of plastic having lower friction, using an injection molding process. A metallic insert 424 may be provided to the inside of the guide holder 420 to thereby improve the rigidity thereof.

In this embodiment, the tension spring 460 operates within a shorter displacement, relative to the conventional torsion spring, thereby providing a good durability. A plurality of tension springs 460 is used to enhance resiliency.

Hereafter, the operation of the slider mechanism of the fourth embodiment will be explained in detail.

FIGS. 54 to 57 show the operations of the slider mechanism of FIG. 49.

Figure 54:
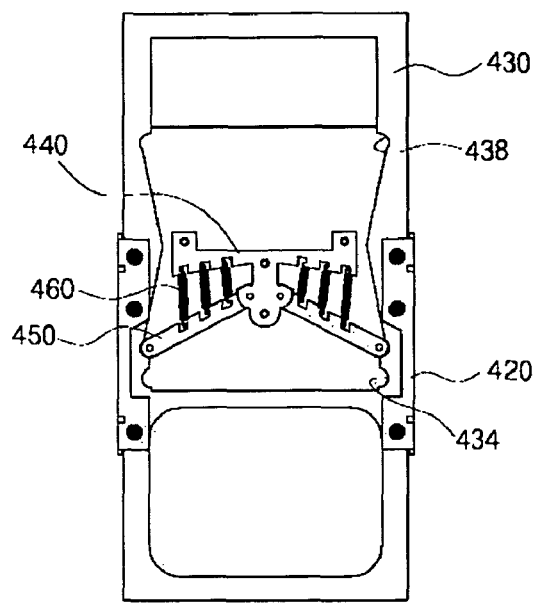
FIGS. 54 to 57 show the operations of the slider mechanism of FIG. 49.

Referring to FIG. 54, where the sub-body is closed on the main body, the tension spring 460 pulls the pivot lever 450 such that the roller 470 remains at the first depression 432.

Figure 55:
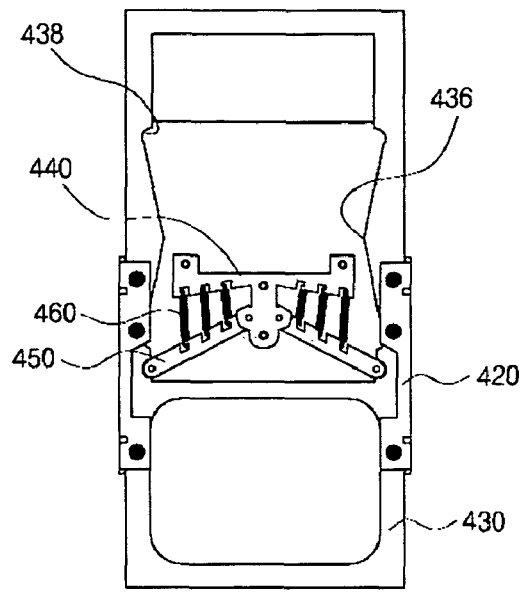
Figure 56:
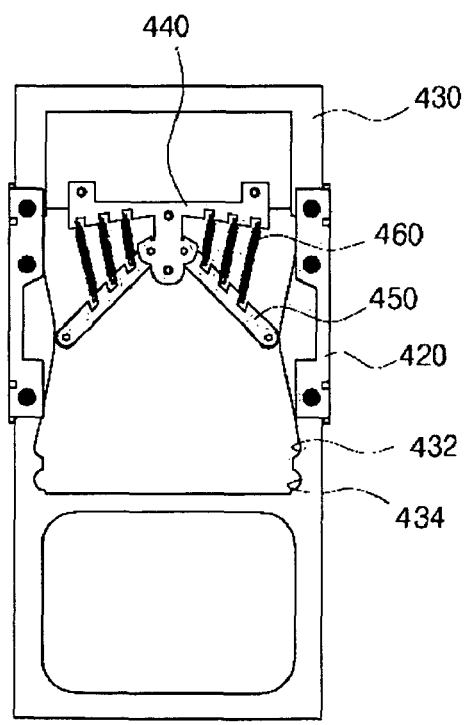

As shown in FIG. 55, if the sub-body is moved down, the roller 470 is released from the first depression 432 and rests on the second depression 434. Then, the roller 470 remains at the second depression 434 due to the resilient force of the tension spring 460.

On the other hand, if the sub-body is moved up, the roller 470 is released from the first depression 432 and passes through the slant plane 436. When the roller 470 moves up along the up-slope of the slant plane 436, it is resisted due to the resilience of the tension spring 460. However, if the roller passes beyond the transition point, the second plate 430 is automatically opened by means of the resilient force of the tension spring 460.

Figure 57:
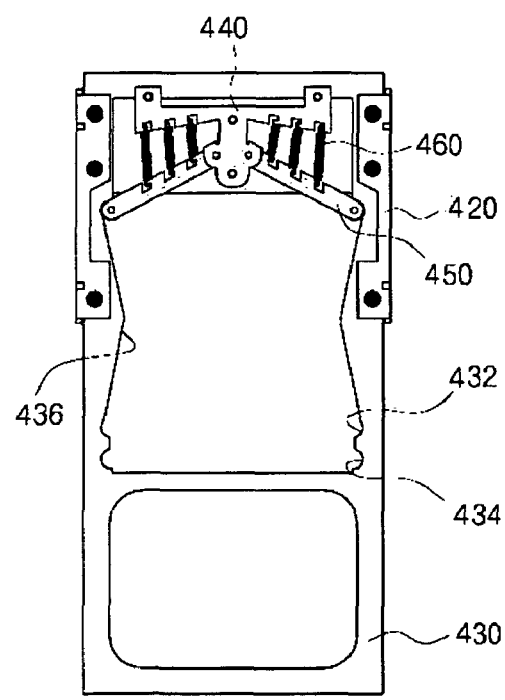

In addition, as shown in FIG. 57, if the roller 470 reaches the second depression 434, it comes to remain there due to the resilience of the tension spring 460.

Hereafter, a slider mechanism according to a sixth embodiment to the invention will be described.

Figure 59:
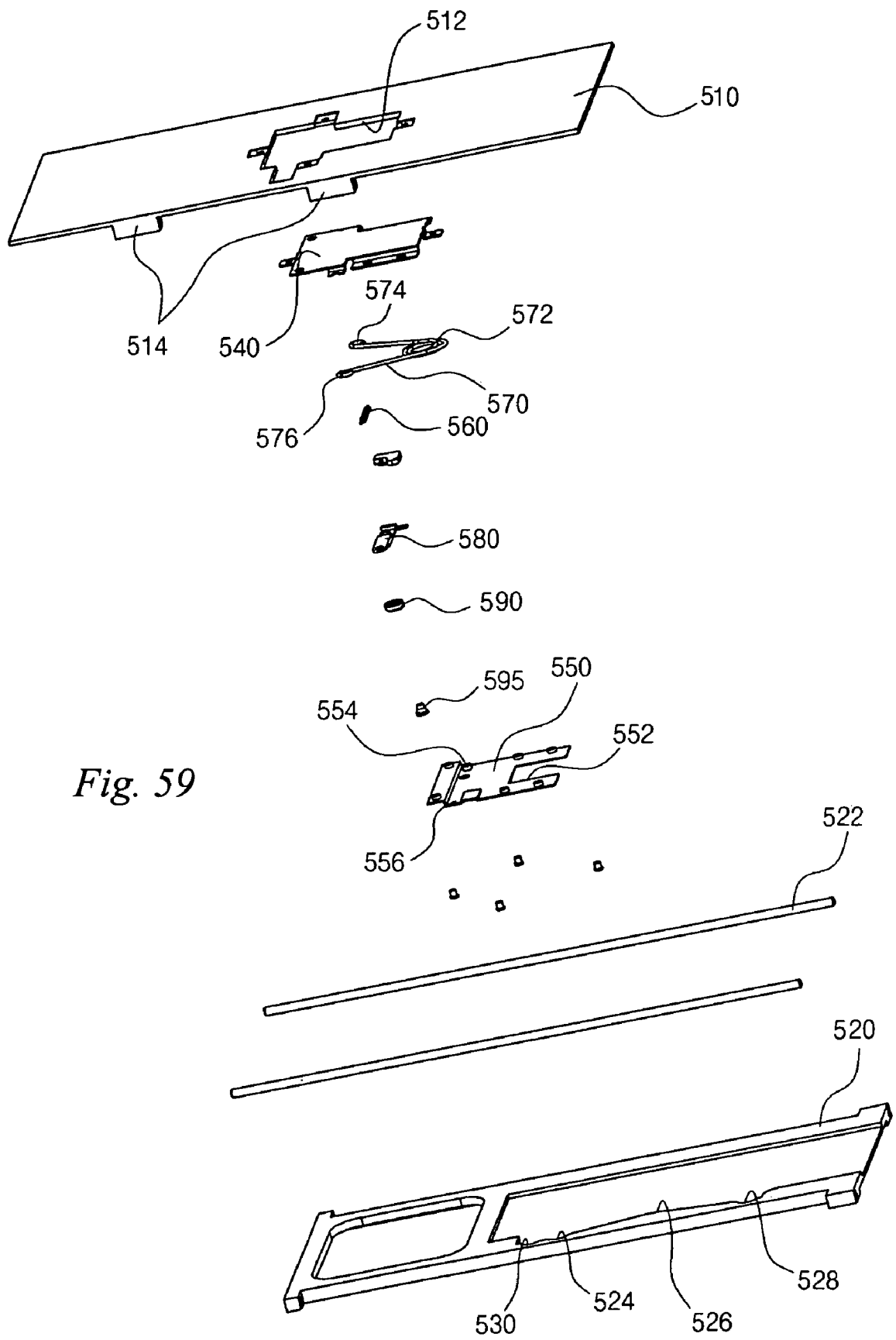
Figure 60:
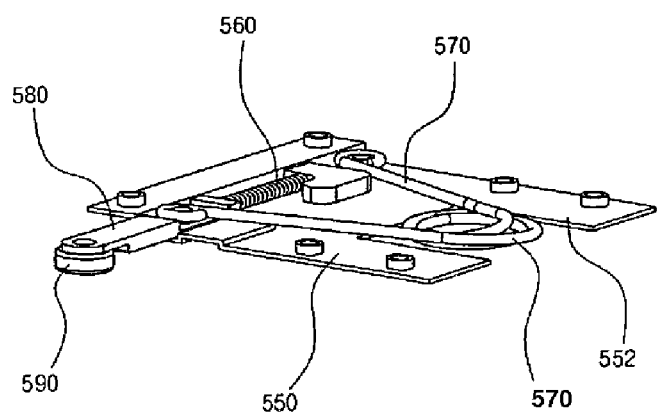
FIG. 60 is a perspective view showing part of the slider mechanism of FIG. 59.

FIGS. 58 and 59 are exploded perspective views of a slider mechanism for portable terminals according to the invention. FIG. 60 is a perspective view showing part of the slider mechanism of FIG. 59.

The slider mechanism combines a sub-body and a main body of a portable terminal with each other so as to slide against each other. The slide mechanism includes a first plate 510 to be fixed to the main body and a second plate 520 to be fixed to the sub-body. The second plate 520 is slidably combined with the first plate 510 in parallel thereto and includes a cam profile formed along the sliding direction. The cam profile is comprised of consecutive depressions and slant planes 526. A slide housing is fixed to the first plate 510. A slide shaft 580 is installed inside of the slide housing so as to move towards and far away from the cam profile. A compressive spring 560 is provided to exert resilient force to the slide shaft 580 within the slide housing. A torsion spring 570 is provided to exert resilient force to the slide shaft 580 within the slide housing, together with the compressive spring 560. A roller 590 is rotatably attached to the slide shaft 580 and contacts and rolls on the cam profile.

In this embodiment, resilient force of the compressive spring 560 and torque of the torsion spring 570 are exerted on the slide shaft 580 so that a strong force is exerted on the slide shaft 580. Thus, the enhanced resilient force by the compressive spring 560 and the torsion spring 570 can achieve a shorter displacement. Accordingly, the service life of the compressive spring 560 and the torsion spring 570 can be extended, without degradation in the functions or failure of the mechanism.

The slide housing is composed of an upper case 540 and the lower case 550, which are made of a metallic material using a press. One of the upper and lower cases 540 and 550 is provided with an opening 552 for receiving the coil portion 572 of the torsion spring 570. The upper and lower cases 540 and 550 may be formed of plastic materials having a high strength.

The slide housing is provided with a passageway 556 through which the slide shaft 580 can move towards and far away from the cam profile.

In addition, the lower case 550 is provided with a plurality of cylinder members 554 protruded through a burring process. The upper and lower cases are combined by a rivet, which is fixed through the cylinder members 554.

A first hook 574 formed at one end of the torsion spring 570 is connected to the cylinder member 554. A second hook 576 formed at the other end of the torsion spring 570 is combined with the slide shaft 580.

The first plate 510 is provided with a cut-out opening 512, into which the slide housing is inserted and fixed thereto, with a roller 590 protruded above the first plate 510. Thus, the total thickness of the first plate 510 and the slide housing can be minimized, thereby leading to a slim slider mechanism.

A guide shaft 522 is fixed to both lateral sides of the second plate 520. The first plate 510 is provided at its both lateral sides with a shaft holder 514, to which the guide shaft 522 is slidably combined.

The cam profile of the second plate 520 includes a first depression 534 formed at the central area thereof, a mountain-like slant plane 526 formed at one side of the first depression 524, a second depression 528 formed at the end of the slant plane 526, and a third depression 530 formed at the other side of the first depression 524.

The roller 590 is rotatably attached to the slide shaft 580 using a rivet 595. The roller 590 rolls along the cam profile when the second plate 530 moves, thereby reducing friction force.

When the roller 590 rests on the first depression 524, the sub-body is closed on the main body. When the roller 590 rests on the second depression 528, the sub-body is opened upwardly on the main body. When the roller 590 rests on the third depression 530, the sub-body is opened downwardly on the main body.

When the roller 590 runs on the up-slope of the slant plane 526, the compressive spring 560 and the torsion spring 570 act to resist the movement of the second plate 520. When the roller 590 rolls down the down-slope of the slant plane 526 beyond the transition point of the mountain-like slant plane 526, the compressive spring 560 and the torsion spring 570 push the second plate 520 such that the second plate 520 is automatically moved.

Hereafter, the operation of the slider mechanism of the sixth embodiment will be explained in detail.

FIGS. 61 to 64 are plan views showing the operation of the slider mechanism of FIG. 58.

Figure 61:
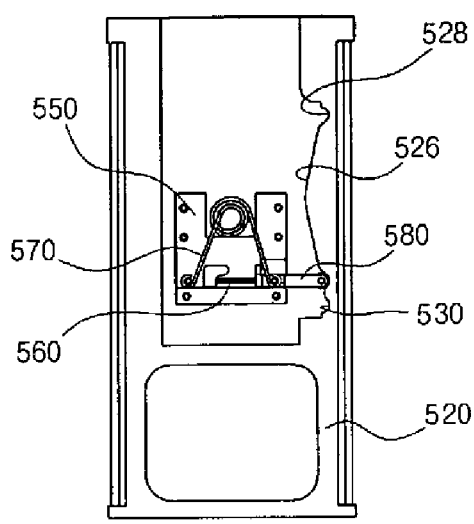
FIGS. 61 to 64 are plan views showing the operation of the slider mechanism of FIG. 58.

Referring to FIG. 61, where the sub-body is closed on the main body, the compressive spring 560 and the torsion spring 570 push the slide shaft 580 and the roller 590 such that the roller 590 remains at the first depression 524.

Figure 62:
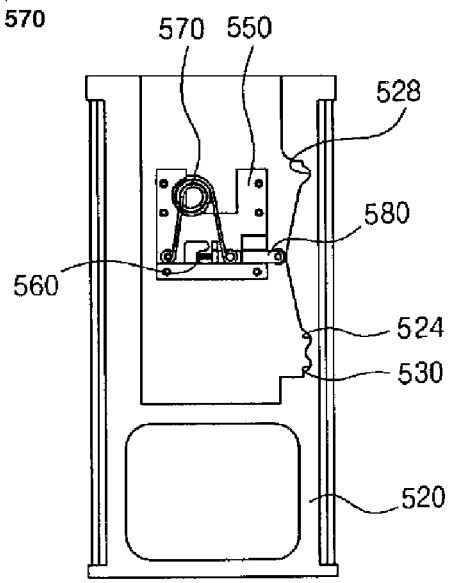

As shown in FIG. 62, if the sub-body is moved up, the roller 590 is released from the first depression 524 and passes through the slant plane 526. When the roller 590 moves up along the up-slope of the slant plane 526, it is resisted due to the resilience of the compressive spring 560 and the torsion spring 570. However, if the roller passes beyond the transition point, the second plate 520 is automatically opened by means of the resilient force of the compressive spring 560 and the torsion spring 570.

Figure 63:
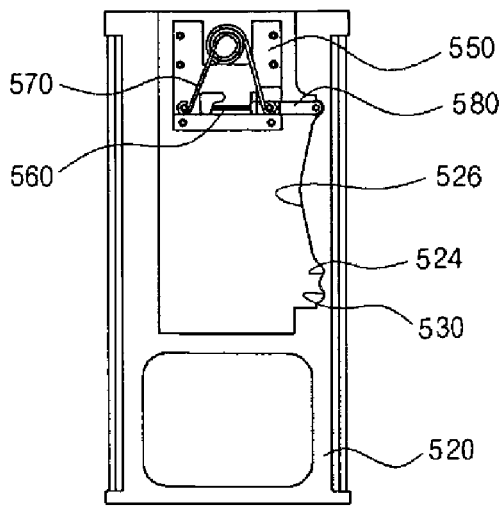

In addition, as shown in FIG. 63, if the roller 590 reaches and rests on the second depression 528, it comes to remain there due to the resilience of the compressive spring 560 and the torsion spring 570.

Figure 64:
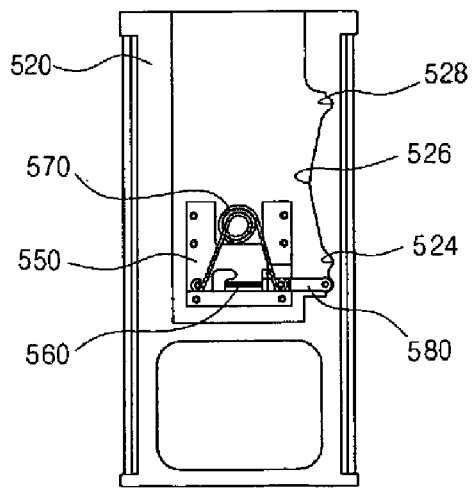

On the other hand, if the sub-body is moved down from the initial state of FIG. 61, the roller 590 is released from the first depression 524 and rests on the third depression 530, as shown in FIG. 64. Similarly, the roller 590 remains at the third depression due to the resilient force of the compressive spring 560 and the torsion spring 570.

Hereafter, a slider mechanism for portable terminals according to a seventh embodiment of the invention will be explained.

Figure 65:
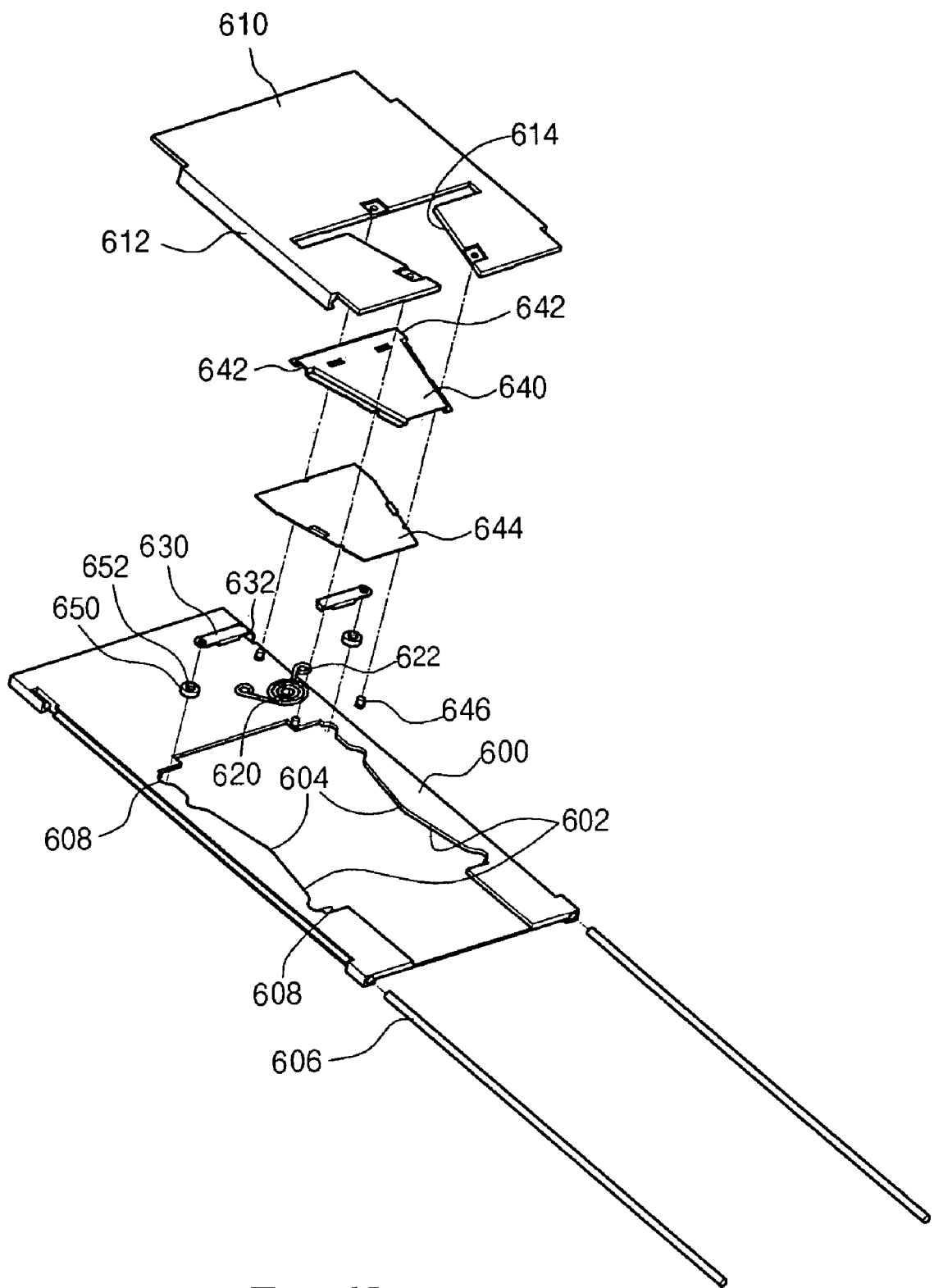
FIG. 65 is an exploded perspective view of a slider mechanism according to a seventh embodiment of the invention.
Figure 66:
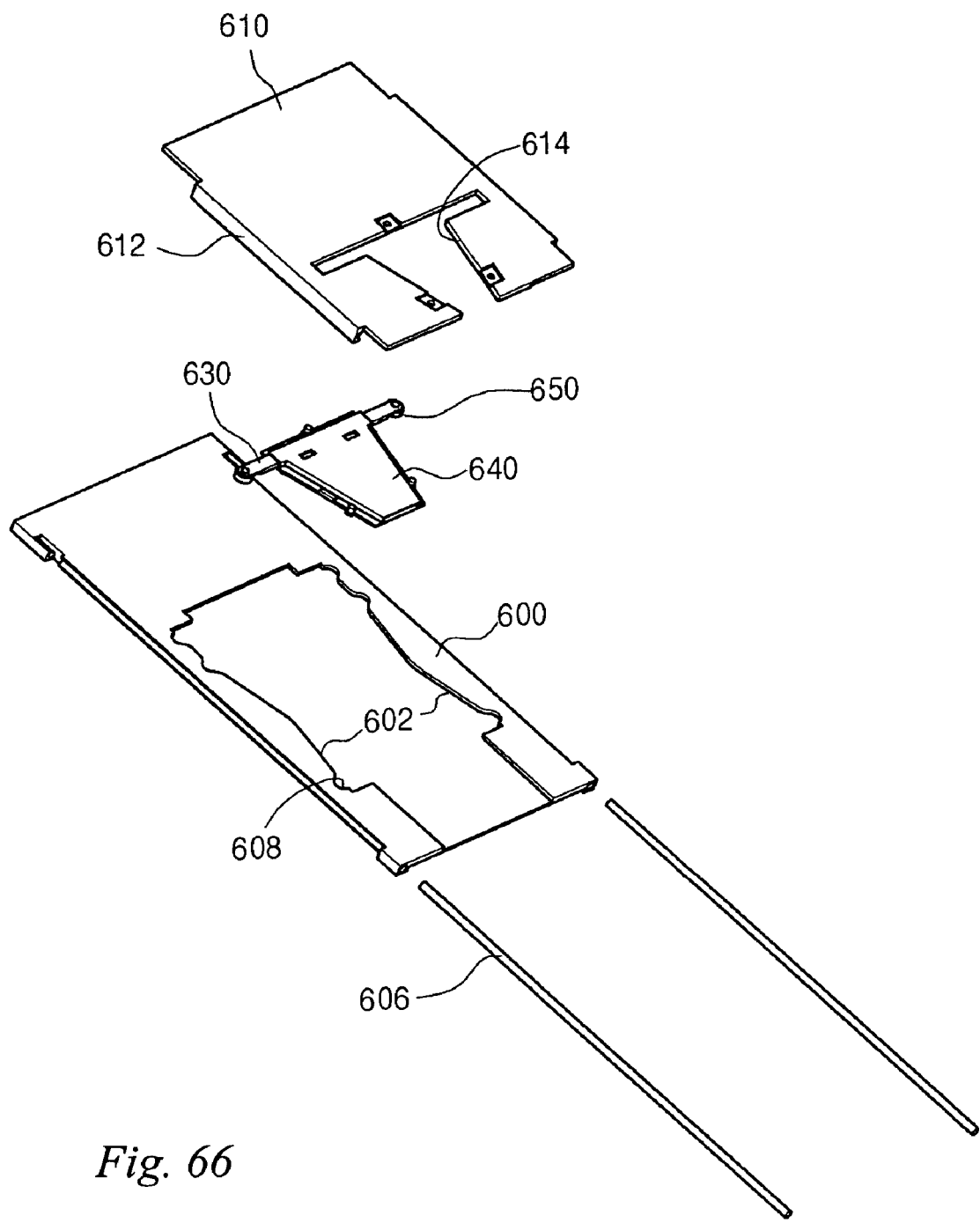
FIG. 66 is a partially assembled view of the slider mechanism of FIG. 65.
Figure 67:
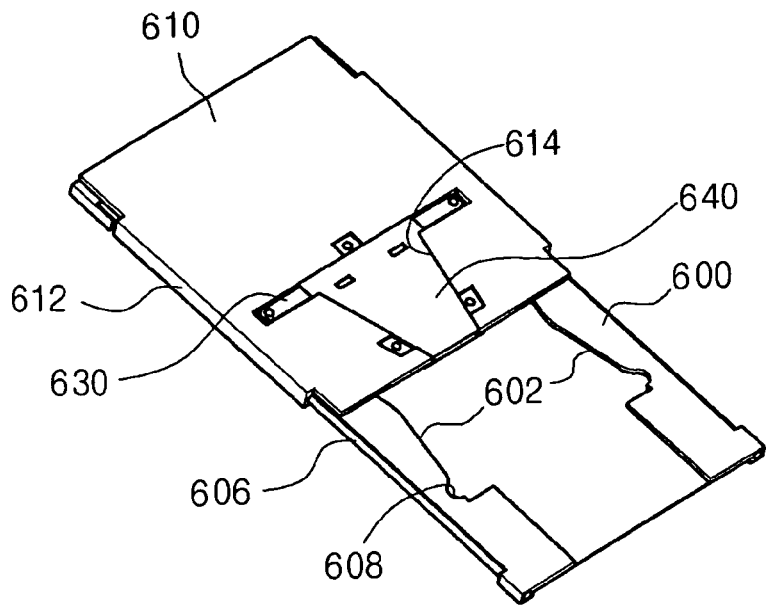
FIG. 67 is an assembled perspective view of the slider mechanism of FIG. 65.
Figure 68:
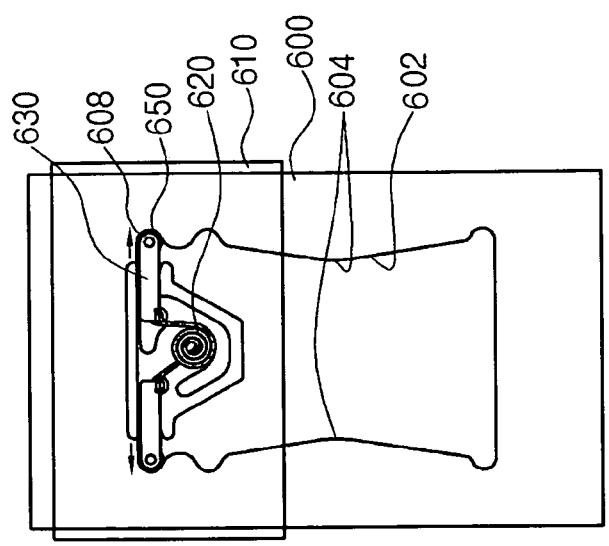
FIGS. 68 and 69 show operations of the slider mechanism of FIG. 65.
Figure 69:
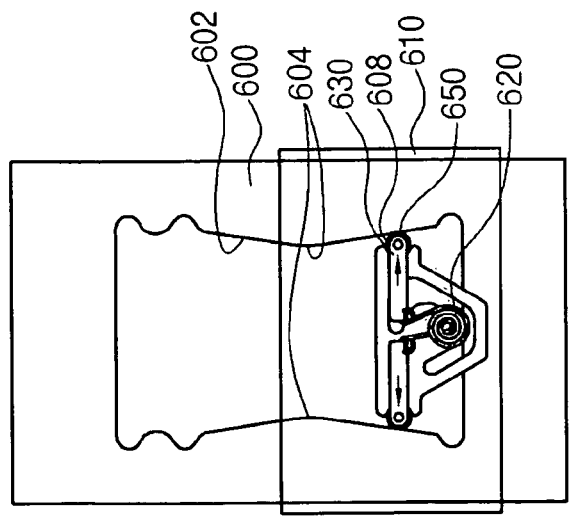

FIG. 65 is an exploded perspective view of a slider mechanism according to a seventh embodiment of the invention. FIG. 66 is a partially assembled view of the slider mechanism of FIG. 65. FIG. 67 is an assembled perspective view of the slider mechanism of FIG. 65. FIGS. 68 and 69 show operations of the slider mechanism of FIG. 65.

The slide mechanism of this embodiment includes a first plate 600 and a second plate 610 slidably combined with the first plate 600. The first plate 600 is provided with a cam profile 602 having at least one depression formed at desired positions. A torsion spring 620 is provided for generating an expansion force. A slide shaft 630 is coupled to one end of the torsion spring 620. A case member 640, 614 is fixed to the second plate 610. The case member accommodates the torsion spring 620 and the slide shaft 630 and guides the slide shaft 630 to move towards and far away from the cam profile 602. A roller 650 is rotatably installed in the slide shaft 630 and rolls along the cam profile 602.

A shaft 606 is fixed to one of the first and second plates 600 and 610. The other one of the first and second plates is provided with a shaft holder 612, which is slidably combined with the shaft 606. Thus, the first and second plates are slidably combined with each other. Alternatively, the first and second plates may be provided with a slit and a rib respective, or vice versa, such that the slit and rib can be slidably combined with each other.

This slider mechanism can be applied to a portable terminal in a way that the first plate 600 is fixed to the main body of a portable terminal and the second plate 610 is fixed to the slide body of the portable terminal, or vice versa.

On the other hand, the depression 608 is formed at both ends of the cam profile 602. This depression 608 holds the roller 650 and allows the roller to remain at the depression. For example, the slide body of the portable terminal can be held in place at open or closed state.

In addition, the cam profile 602 is provided with a convex portion 604 formed between the two depressions 608. The convex portion 604 is convex towards the slide shaft 630. Thus, while the roller 650 runs up along the up-slope of the convex portion 604, the torsion spring 620 is compressed to resist the movement of the roller 650. If the roller 650 passes through the transition point of the convex portion 604, the roller 650 can automatically rolls down along the down-slope of the convex portion 604 by means of resilience of the torsion spring.

Due to the above-configured cam profile, if a user pushes the slide body of a portable terminal until the transition position of the cam profile 602, then the slide body can be spontaneously closed or opened.

The torsion spring 620 is provided at both ends with a hook 622, each of which is coupled to a latch 632 formed in each of the slide shafts 630.

The case member is comprised of an upper cover 640 and a lower cover 644 combined with the upper cover 640. The upper cover 640 and the lower cover 644 provide a space in-between where the torsion spring 620 can operate.

In addition, the second plate 610 is provided with a cut-out opening 614, into which the case member is inserted and fixed to the second plate 610, thereby enabling to minimize the thickness of the slider mechanism.

The case member is provided with a guide groove 642 formed so as to guide the slide shaft 630 to move towards the cam profile 602.

A rivet 646 or like can be used to fix the case member to the second plate 610.

The cam profile 602 includes a pair of cam profiles formed in parallel to each other and spaced apart from each other. The slide shaft 630 includes a pair of slide shafts, which are connected to both ends of the torsion spring 620 respectively and move towards the respective cam profiles 602. The roller 650 is rotatably attached to each slide shaft 630.

In this way, since a pair of slide shafts 630 are provided, the resilient force of the torsion spring can be uniformly exerted to both cam profiles 602. Thus, the first and second plates 600 and 610 can smoothly slide against each other, without wobbling to either side.

The roller 650 is rotatably combined to the slide shaft 630 using a rotation shaft.

The first and second plates 600 and 610, the case member and the slide shaft 630 may be formed of a metallic material or a plastic material through an injection molding.

Hereafter, operation of the above-structured slider mechanism will be explained.

The torsion spring 620 makes the slide shaft 630 to be biased to the cam profile 602. The guide groove 642 formed in the case member guides the slide shaft 620 to move towards the cam profile 602.

When the portable terminal is opened or closed, the roller 650 coupled to the slide shaft 630 rests on the depression 608 of the cam profile 602 and remains at the depression due to the resilience of the torsion spring. Thus, the slide body of the portable terminal is held in place at the open or closed state.

If the second plate 610 is pushed, the roller 650 is released from the depression 608 and rolls along the cam profile 602.

The roller 650 rotates about a shaft 652 and moves along the cam profile 602, thereby significantly reducing the friction force with the cam profile 602.

While the roller 650 runs up along the up-slope of the convex portion 604 and reaches the transition point of the convex portion, the torsion spring 620 resists the movement of the second plate 610.

However, the roller 650 rolls beyond the transition point, the resilient force of the torsion spring 620 is exerted to the moving direction of the second plate 610. Thereafter, the second plate 610 moves spontaneously.

During the movement of the second plate 610, the guide groove 642 formed in the case member allows the slide shaft 630 to move towards and far away from the cam profile 602.

When the roller 650 runs through the cam profile 602 to reach the opposite depression 608, the slide body of the portable terminal can be held at opened or closed state, due to the torsion spring.

On the other hand, if the second plate 610 is pushed in reverse direction, the opposite operation occurs to return the second plate to its original position.

As described above, the present invention provides a slider mechanism for portable communication terminals, which can slidably open or close the terminals in a smooth manner and has an improved durability.

Although the present invention has been described with reference to several preferred embodiments, the description is illustrative of the invention and not to be construed as limiting the invention. Various modifications and variations may occur to those skilled in the art without departing from the scope and spirit of the invention, as defined by the appended claims.

For example, the resilience means in the above embodiments of the invention is explained illustrating a compressive or tension coil spring or a torsion spring. However, it is understood to those skilled in the art that these illustrated springs may be replaced by other types of springs such as a zigzag-shaped spring. A zigzag-shaped spring disclosed in Korean Design Registration Application No. 30-2006-0011569 (filed on Mar. 29, 2006) or Korean Patent Application No. 10-2005-10549 (filed on Feb. 4, 2005) may replace the compressive or tension coil springs or the torsion spring illustrated in the embodiments of the invention.

The invention claimed is:

1. A slider mechanism for slidably opening and closing a portable communication terminal, the slider mechanism comprising:
a first cover;
a second cover slidably combined with the first cover;
a guide member for guiding such that the first cover can move straight and along a longitudinal direction of the second cover; and
a plunger assembly disposed between the second cover and the first cover and for stopping the first cover at a desired position during sliding of the first cover,
wherein the plunger assembly includes a housing member having an open end; a plunger slidably inserted into the open end of the housing member, a roller being rotatably attached to one end of the plunger and an insert shaft being formed at the other end of the plunger along a longitudinal direction of the plunger; and a compressive spring inserted onto the insert shaft and resiliently supporting the plunger,
wherein a latching groove is formed in a face of the plunger and extended along the longitudinal direction of the plunger, and
a stopper that protrudes from the housing member extends into the latching groove to limit movement of the plunger.

2. The mechanism as claimed in claim 1, wherein the stopper is formed so as to be inclined upwardly toward the open end of the housing member.

3. The mechanism as claimed in claim 1, wherein the housing member includes a first housing and a second housing to be combined with the first housing so as to provide a space where the plunger can be accommodated, wherein the first housing is formed integrally with the second housing.

4. The mechanism as claimed in claim 3, wherein the first and second housings are combined in a way that one lateral side thereof are integrally formed and bent, and the other lateral side thereof are connected by bending.

5. The mechanism as claimed in claim 1, wherein the plunger assembly is combined to the first cover, the second cover is provided with a guide groove formed for the plunger assembly to rest thereon, and at least one stopper depression is formed in the guide groove such that the roller of the plunger can be stopped at a desired position.

6. The mechanism as claimed in claim 5, wherein the stopper depression is provided at the free end thereof with an insert slope through which the roller can be easily inserted and rested on the guide groove.

7. The mechanism as claimed in claim 1, wherein an insert-protrusion is formed at the other end of the housing member and the first cover is provided with an insert-hole into which the insert-protrusion is inserted, thereby the plunger assembly being snapped in the first cover.

8. The mechanism as claimed in claim 1, wherein the guide member includes:
a first guide member mounted on lateral sides of the first and second covers; and
a second guide member mounted on the other lateral sides of the first and second covers generally opposite the first guide member.

9. The mechanism as claimed in claim 8, wherein:
the first guide member includes a first sliding track and a first sliding spacer; and
the second guide member includes a second sliding track and a second sliding spacer.

10. The mechanism as claimed in claim 9, wherein the first and second sliding spacers comprise synthetic resin.

11. The mechanism as claimed in claim 9, wherein the second cover includes lateral sides having sliding grooves into which the respective first and second sliding tracks are inserted.

12. The mechanism as claimed in claim 9, wherein the first and second sliding spacers are disposed between the lateral sides of the first and second covers such that the lateral sides of the first cover are in direct contact with the corresponding lateral sides of the second covers.

13. The mechanism as claimed in claim 9, wherein:
the first sliding spacer includes:
a lower side having a first latching protrusion and a first fixing protrusion; and
an upper side having a first sliding contact, the upper portion of the sliding contact being inserted into a sliding groove of the second cover;
the second sliding spacer includes:
a lower side having a second latching protrusion and a second fixing protrusion; and
an upper side having multiple second sliding contacts and an elastic protrusion between the multiple second sliding contacts, the upper portions of the sliding contacts being inserted into a sliding groove of the second cover;
the first cover includes:
first and second release-inhibition latches at the lateral sides of the first cover such that the first and second latching protrusions are latched to the respective first and second release-inhibition latches to prevent the first and second sliding spacers from escaping from the lateral sides of the first cover;
first and second fixing grooves into which the respective first and second fixing protrusions are inserted such that the first cover and the first and second sliding spacers are movable together;
insert-positioning protrusions protruded at the lateral sides of the first cover and inserted into first and second insert holes of the respective first and second sliding tracks.

14. The mechanism as claimed in claim 13, wherein the second sliding track includes an escape hole at a position corresponding to the elastic protrusion, such that the elastic protrusion can elastically bend backwards into the escape hole to thereby provide a further resilience to the elastic protrusion.

15. The mechanism as claimed in claim 1, wherein the latching groove has a slant plane corresponding to the stopper.

16. The mechanism as claimed in claim 1, wherein the stopper is configured such that:

the stopper is pushed downwardly by the plunger when the plunger is slidably inserted into the open end of the housing member; and when the latching groove reaches the stopper, the stopper is restored to its original position due to its resiliency so that that stopper is inserted into the latching groove.

17. The mechanism as claimed in claim 1, wherein:
the plunger assembly is combined with the first cover; and
the second cover includes a guide groove extending along a longitudinal direction of the second cover and in which is received the roller of the plunger; and
the guide groove includes at least one stopper depression such that the roller of the plunger can be latched with the at least one stopper depression to be stopped at a desired position.

18. The mechanism as claimed in claim 17, wherein the compressive spring applies a force that biases the roller to remain latched with the at least one stopper depression thereby helping retain the relative positioning of the first and second covers.

19. The mechanism as claimed in claim 18, wherein the roller cannot arbitrarily move out of the at least one stopper depression without any external force sufficient to overcome the biasing force of the compression spring.

20. The mechanism as claimed in claim 17, wherein the at least one stopper depression includes:
  a first stopper depression at one end portion of the guide groove, the roller of the plunger being latched with the first stopper depression when the first cover is closed relative to the second cover;
  a second stopper depression at the other end portion of the guide groove, the roller of the plunger being latched with the second stopper depression when the first cover is open relative to the second cover; and
  a third stopper depression at a middle portion of the guide groove between the end portions of the guide groove, the roller of the plunger being latched with the third stopper depression when the first cover is partially opened relative to the second cover.

21. The mechanism as claimed in claim 1, wherein the plunger assembly includes two insert shaft and two compression springs on the corresponding insert shafts.

22. A portable communication terminal comprising the mechanism as claimed in claim 1.

23. A slider mechanism for slidably opening and closing a portable communication terminal, the slider mechanism comprising:
  a first cover;
  a second cover slidably coupled to the first cover;
  a plunger assembly disposed between the first and second covers, the plunger assembly operable for stopping the second cover at a desired position after being slidably moved relative to the first cover, the plunger assembly including:
    a housing member having an open end;
    a plunger slidably inserted into the open end of the housing member;
    a roller rotatably attached to one end of the plunger;
    a biasing device operable for applying a force for biasing the roller; and
    a latching groove is formed in a face of the plunger and extended along the longitudinal direction of the plunger; and
    a stopper that protrudes from the housing member extends into the latching groove to limit movement of the plunger.

24. The mechanism as claimed in claim 23, wherein the stopper is configured such that:
  the stopper is pushed downwardly by the plunger when the plunger is slidably inserted into the open end of the housing member; and
  when the latching groove reaches the stopper, the stopper is restored to its original position due to its resiliency so that that stopper is inserted into the latching groove.

25. The mechanism as claimed in claim 23, wherein:
the housing member includes an insert-protrusion at the other end of the housing member; and
the first cover includes an insert-hole into which the insert-protrusion is inserted, thereby the plunger assembly being snapped in the first cover.

26. The mechanism as claimed in claim 23, wherein:
an insert shaft extends outwardly from the other end of the plunger along a longitudinal direction of the plunger; and
the biasing device comprises at least one compressive spring inserted onto the insert shaft.

27. The mechanism as claimed in claim 23, further comprising:
  a first guide member mounted on lateral sides of the first and second covers; and
  a second guide member mounted on the other lateral sides of the first and second covers generally opposite the first guide member;
  wherein:
    the first guide member includes a first sliding track and a first sliding spacer;
    the second guide member includes a second sliding track and a second sliding spacer; and
    the second cover's lateral sides include sliding grooves into which the respective first and second sliding tracks are inserted.

28. The mechanism as claimed in claim 27, wherein the first and second sliding spacers comprise synthetic resin.

29. The mechanism as claimed in claim 27, wherein:
the first sliding spacer includes:
  a lower side having a first latching protrusion and a first fixing protrusion; and
  an upper side having a first sliding contact, the upper portion of the sliding contact being inserted into a sliding groove of the second cover;
the second sliding spacer includes:
  a lower side having a second latching protrusion and a second fixing protrusion; and
  an upper side having multiple second sliding contacts and an elastic protrusion between the multiple second sliding contacts, the upper portions of the sliding contacts being inserted into a sliding groove of the second cover;
the first cover includes:
  first and second release-inhibition latches at the lateral sides of the first cover such that the first and second latching protrusions are latched to the respective first and second release-inhibition latches to prevent the first and second sliding spacers from escaping from the lateral sides of the first cover;
  first and second fixing grooves into which the respective first and second fixing protrusions are inserted such that the first cover and the first and second sliding spacers are movable together;
  insert-positioning protrusions protruded at the lateral sides of the first cover and inserted into first and second insert holes of the respective first and second sliding tracks.

30. The mechanism as claimed in claim 29, wherein the second sliding track includes an escape hole at a position corresponding to the elastic protrusion, such that the elastic protrusion can elastically bend backwards into the escape hole to thereby provide a further resilience to the elastic protrusion.

31. The mechanism as claimed in claim 23, wherein:
the second cover includes a guide groove extending along a longitudinal direction of the second cover and in which is received the roller of the plunger; and
the guide groove includes at least one stopper depression such that the roller of the plunger can be latched with the at least one stopper depression to be stopped at a desired position.

32. The mechanism as claimed in claim 31, wherein the biasing device applies a force that biases the roller to remain latched with the at least one stopper depression until an external force is applied sufficient to overcome the biasing force of the compression spring.

33. The mechanism as claimed in claim 31, wherein the at least one stopper depression includes:
a first stopper depression at one end portion of the guide groove, the roller of the plunger being latched with the first stopper depression when the first cover is closed relative to the second cover;
a second stopper depression at the other end portion of the guide groove, the roller of the plunger being latched with the second stopper depression when the first cover is open relative to the second cover; and
a third stopper depression at a middle portion of the guide groove between the end portions of the guide groove, the roller of the plunger being latched with the third stopper depression when the first cover is partially opened relative to the second cover.

34. A portable communication terminal comprising the mechanism of claim 23.

* * * * *